United States Patent
Erickson

(10) Patent No.: US 10,150,523 B2
(45) Date of Patent: Dec. 11, 2018

(54) TRACTOR WITH TRACK DRIVE

(71) Applicant: VERMEER MANUFACTURING COMPANY, Pella, IA (US)

(72) Inventor: Daniel Ray Erickson, Pella, IA (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 0 days.

(21) Appl. No.: 15/014,550

(22) Filed: Feb. 3, 2016

(65) Prior Publication Data

US 2016/0221617 A1  Aug. 4, 2016

Related U.S. Application Data

(60) Provisional application No. 62/111,514, filed on Feb. 3, 2015, provisional application No. 62/218,683, filed on Sep. 15, 2015.

(51) Int. Cl.
*B62D 55/065* (2006.01)
*B62D 53/02* (2006.01)
(Continued)

(52) U.S. Cl.
CPC .......... B62D 55/0655 (2013.01); B60K 17/34 (2013.01); B60R 3/00 (2013.01);
(Continued)

(58) Field of Classification Search
CPC .......... B60K 17/34; B60R 3/00; B62D 55/04; B62D 55/06; B62D 55/30; B62D 55/0655; B62D 53/021; B62D 49/00
(Continued)

(56) References Cited

U.S. PATENT DOCUMENTS 2,309,793 A    2/1943  Sedore et al.
2,388,683 A *  11/1945  Frickey ................... B61K 9/10
                                                    324/217
(Continued)

FOREIGN PATENT DOCUMENTS

EP        360640 A1     3/1990
WO    2011154533 A1    12/2011

OTHER PUBLICATIONS

Chinese Application No. 201620111684.7, First Office Action dated May 24, 2016.
(Continued)

*Primary Examiner* — Joseph M Rocca
*Assistant Examiner* — Felicia L. Brittman
(74) *Attorney, Agent, or Firm* — Michael Best & Friedrich LLP

(57) ABSTRACT

An off-highway vehicle has a front chassis portion, a rear chassis portion, a front ground drive system and a rear ground drive system. The front chassis portion has a front axle assembly having a front axle housing and a front axle shaft carrying a front wheel hub. The rear chassis portion has a rear axle assembly including a rear axle housing and a rear axle shaft carrying a rear wheel hub. The front ground drive system includes a front drive wheel mounted to the front wheel hub, a front idler wheel mounted to the front axle housing via a front drive frame member in front of the front drive wheel. The rear ground drive system has a rear drive wheel mounted to the rear wheel hub, a rear idler wheel mounted to the rear axle housing via a rear frame member behind the rear drive wheel.

20 Claims, 20 Drawing Sheets

(51) Int. Cl.
- *B62D 55/30* (2006.01)
- *B62D 49/00* (2006.01)
- *B60R 3/00* (2006.01)
- *B60K 17/34* (2006.01)
- *B62D 55/06* (2006.01)
- *B62D 55/04* (2006.01)

(52) U.S. Cl.
CPC ............. *B62D 49/00* (2013.01); *B62D 53/02* (2013.01); *B62D 53/021* (2013.01); *B62D 55/04* (2013.01); *B62D 55/06* (2013.01); *B62D 55/30* (2013.01)

(58) Field of Classification Search
USPC ........................................................ 180/9.21
See application file for complete search history.

(56) References Cited

U.S. PATENT DOCUMENTS

| | | | |
|---|---|---|---|
| 3,771,241 A | 11/1973 | Lindell et al. | |
| 4,072,203 A | 2/1978 | Pierson | |
| 4,487,286 A * | 12/1984 | van der Lely | B60S 1/68 172/435 |
| 4,966,242 A * | 10/1990 | Baillargeon | B62D 55/0655 180/242 |
| 5,113,958 A * | 5/1992 | Holden | B62D 11/20 180/9.1 |
| 6,164,399 A * | 12/2000 | Bays | B62D 55/0655 180/9.21 |
| 6,318,484 B2 | 11/2001 | Lykken et al. | |
| 6,401,847 B1 | 6/2002 | Lykken | |
| 8,245,800 B2 | 8/2012 | Hansen | |
| 8,430,188 B2 | 4/2013 | Hansen | |
| 2005/0035650 A1 | 2/2005 | Toews | |
| 2010/0139994 A1* | 6/2010 | Hansen | B62D 55/04 180/9.26 |

OTHER PUBLICATIONS

EP Application No. 16153903.6, European Extended Search Report, dated Jun. 22, 2016.

Chinese Application No. 201620111684.7, Notice of Allowance dated Aug. 24, 2016.

Canadian Application No. 2919291, Examiner's Report dated Mar. 3, 2017, 4 pages.

* cited by examiner

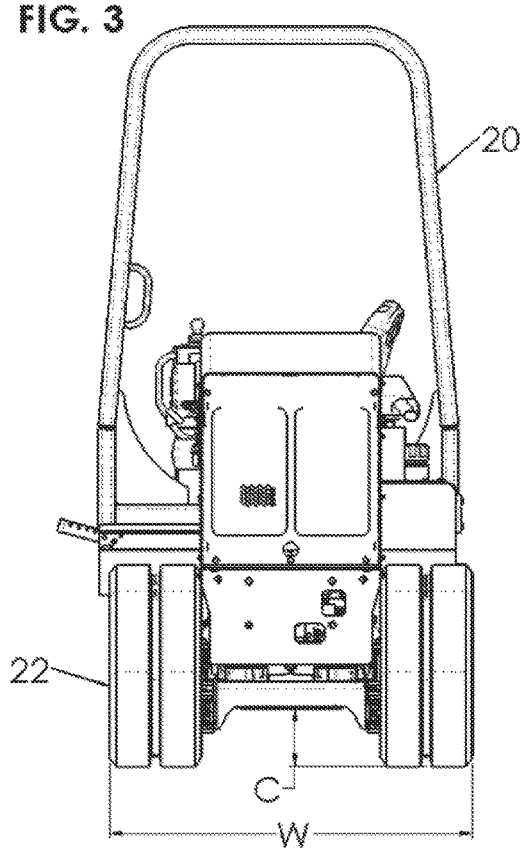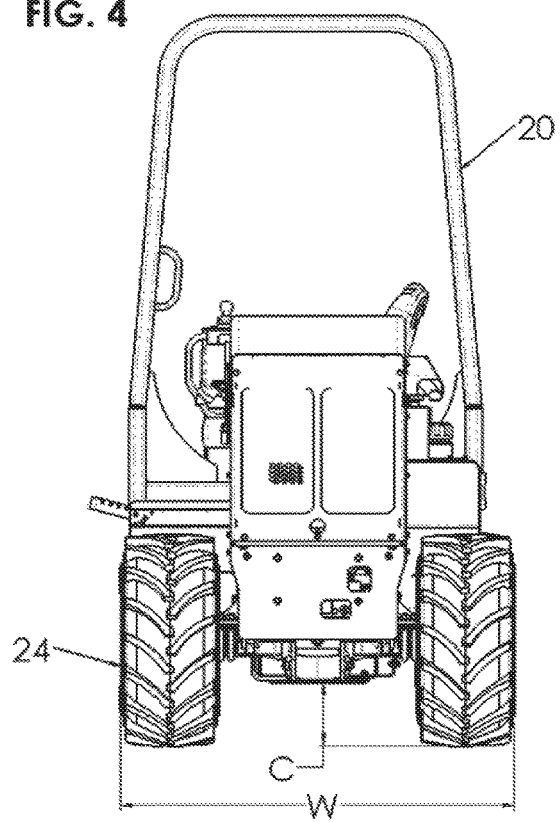

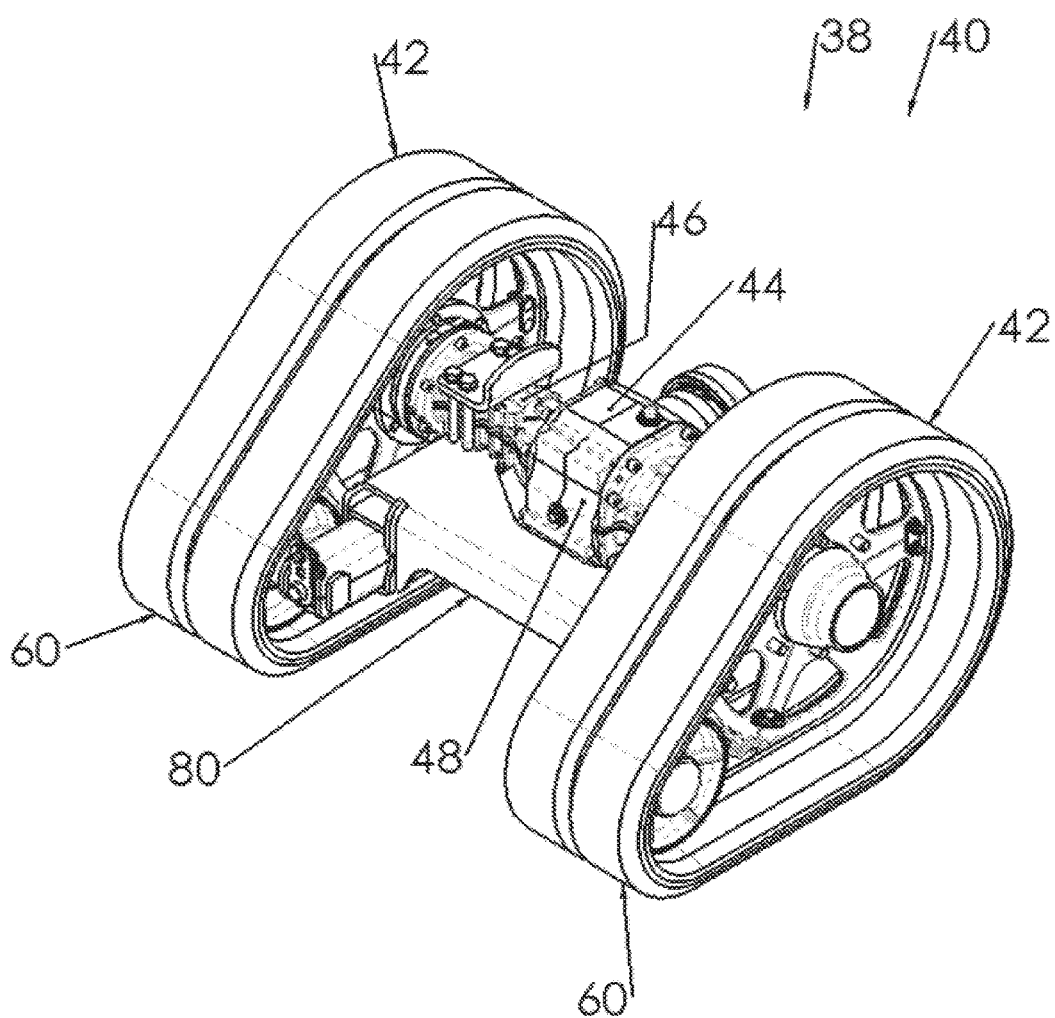

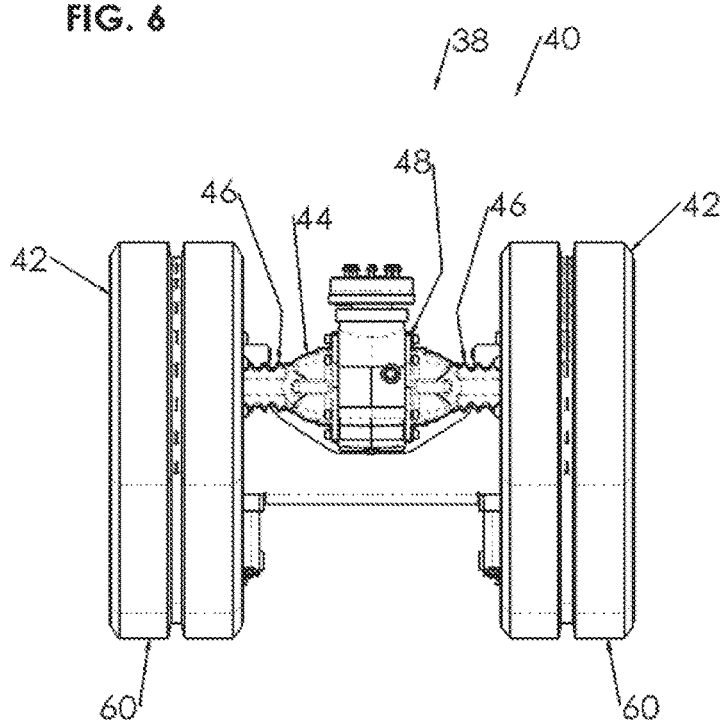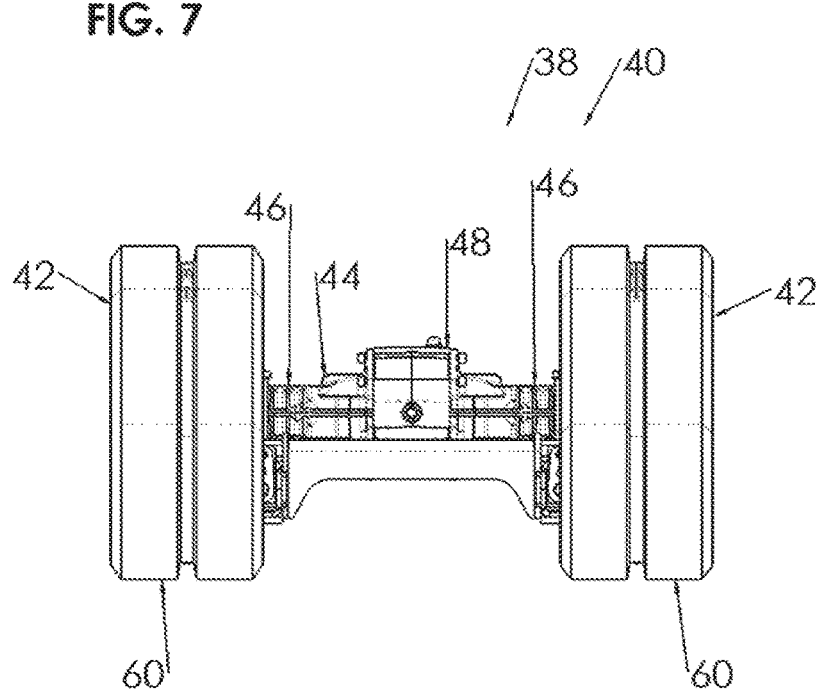

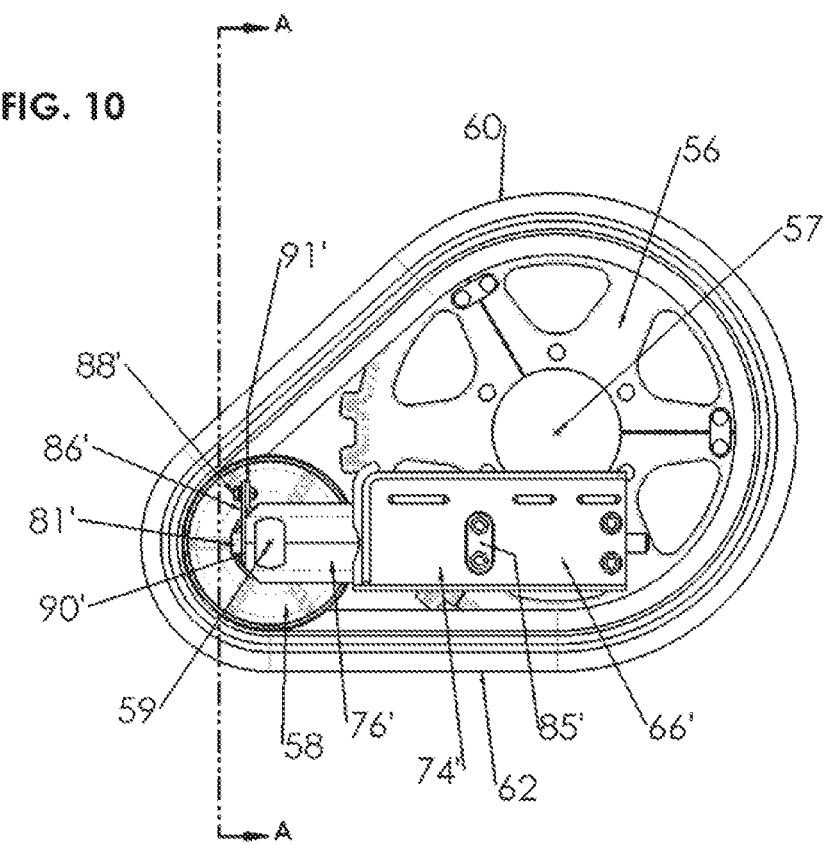
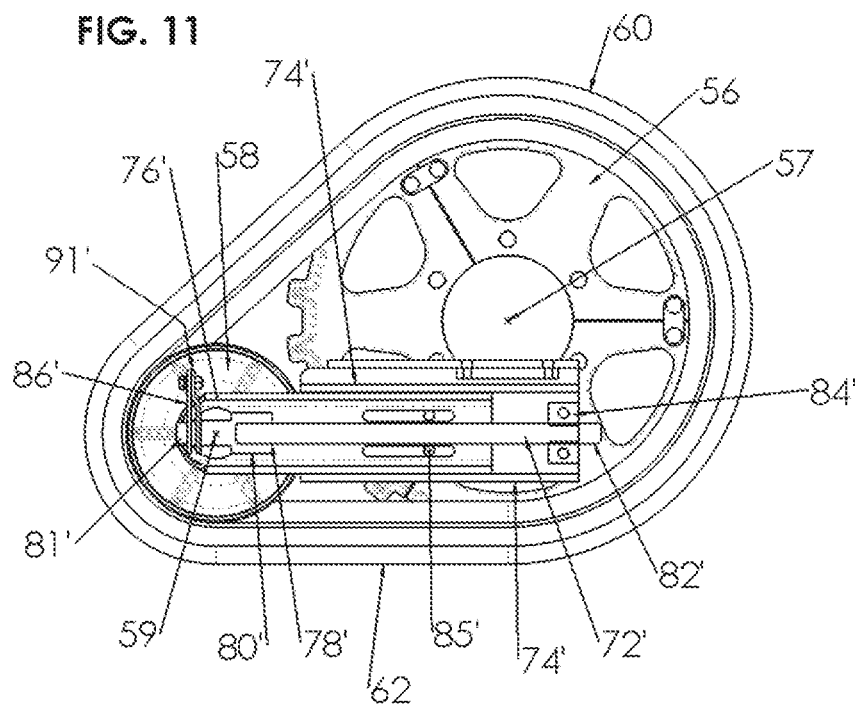

TRACTOR WITH TRACK DRIVE

CROSS-REFERENCE TO RELATED APPLICATIONS

This application claims priority to U.S. Provisional Patent Application No. 62/111,514, filed Feb. 3, 2015 and U.S. Provisional Patent Application No. 62/218,683, filed Sep. 15, 2015, both of which are incorporated by reference herein in their entireties.

TECHNICAL FIELD

The present application relates to a tractor and, more particularly, a tractor that provides a drive system in which track drive units are interchangeable with tires.

BACKGROUND

Articulated 4-wheel drive vehicles have been used in a variety of applications including logging, farming, construction, among others. This machine configuration offers advantages in maneuverability. Several examples of articulated vehicles can be found in the literature utilizing pneumatic tires installed on wheels, while many others can be found utilizing tracks as the ground engaging component. There are geometrical constraints inherent with the use of an articulated frame, which typically require the machine designer to configure a machine for a specific ground engaging component.

An example can be found in U.S. Pat. No. 4,072,203 where an articulated vehicle is described with tracks that are configured and mounted to the vehicle in a specific manner to improve maneuverability. Another application is described in U.S. Pat. No. 3,771,241, describing a vehicle designed for utility installation. The articulated steering tractors offer advantages in their ability to operate in a wide range of conditions, particularly with compact machines where a primary objective is to minimize the size of the machine. In some cases, pneumatic tires on wheels provide adequate performance, and offer advantages in cost and simplicity. However, when these machines are operated on lawns or finished green space, it is sometimes desired to reduce the turf disturbance that can result from the standard tires. There is a need for an articulated 4-wheel drive vehicle that can be equipped with either pneumatic tires mounted to wheels or track units for the ground engaging components in order to meet the varying needs of the compact utility installation market. There is also a need for a simplified, cost effective track drive system for compact articulated frame vehicles.

Drive systems for 4-wheel drives are well known, and typically include an inter-axle differential to allow differences in speed front-to-rear and differential in both the front axle assembly and the rear axle assembly. Both the front and rear axle assemblies include an axle housing, in which the differential is mounted, and in which the axle shafts are mounted. The axle shafts terminate with either an integral wheel hub, or a wheel hub that is mounted to the axle shaft. For machines that utilize a pneumatic tire mounted to a wheel, the wheel is mounted to the wheel hub, which then supports the weight of the vehicle, while simultaneously transmitting the driving torque to the wheel.

Vehicles designed as dedicated track units include a similar arrangement, except that the axle shafts do not terminate with a wheel hub, but instead terminate at a drive sprocket. A track assembly that includes all the track rollers typically mounted in a frame is typically carried on the axle housing, as shown in U.S. Pat. No. 4,072,203. In this traditional arrangement the weight of the vehicle is supported by the axle housing, while the axle shaft only has to transmit the drive torque. This arrangement provides a track frame assembly that controls the position of all the track rollers, to keep them all in alignment, as required for reliable performance of the track.

An alternate driven track unit, without a track frame to which all the track rollers is mounted, is described in U.S. Pat. No. 2,309,793 including a pair of drive shafts in a housing, an axle housing mounted to a frame. A pair of sprockets is mounted on the drive shafts. A pair of freely rotating shafts is journaled in bearings in a sub-axle housing positioned parallel to the drive shafts, and mounted to the frame on leaf spring assemblies. A pair of wheels is mounted to these shafts. A sprocket is mounted to the drive shaft on one side, and a wheel is mounted to the rotating shaft on that same side, and a track is routed over the sprocket and the wheel. The sprocket and wheel are held generally in alignment due to the fact that the axle housing and the sub-axle housing are parallel, when viewed in a top view. The fact that the sub-axle is mounted to the frame via leaf springs, where the spring can be deflected more on one side than the other, results in the potential that, although the axle housing and sub-axle are parallel when viewed in a top view, they will not be parallel when viewed in a rear view. Thus, they are not truly parallel, which will result in the situation that the sprocket is not exactly aligned with the wheel. Any such mis-alignment is potentially detrimental to the operation of the track, depending on the type of track and sprocket/wheel utilized.

BRIEF SUMMARY

The present invention meets the need for a track unit as the ground engaging component, as an option to a pneumatic tire and wheel, for a compact articulated 4-wheel drive vehicle including:
  Providing a track unit that can be used interchangeably with a pneumatic tire mounted to a wheel by:
    Retaining the geometrical characteristic that is critical for an articulated vehicle—the maximum diameter of the ground engaging component in one horizontal direction is the same as the diameter of the wheel/tire that it replaces (the track unit is not symmetrical, used in a pair, with the front track unit oriented in a first direction and the rear track unit oriented in a second direction); and
    Utilizing a mount arrangement that can be adapted to a standard axle assembly—the track idler frame bolts to the axle housing, but also utilizes a structural cross-member that connects a pair of track idler frames.
  Providing a track unit that is simplified in construction to be cost effective and reliable, and that meets the needs of a compact vehicle—for this small machine it is acceptable to have the track idler roller rigidly mounted to the axle and to the corresponding track idler roller on the opposite side of the machine.
  Providing a track unit that does not reduce ground clearance—the structural cross-member connecting the track idler frames can be positioned at a location different than the center of the idler rollers (prior art devices teach the use of a second axle aligned with the center of the idler roller, which would result in less ground clearance).

An off-highway vehicle generally includes front and rear chassis portions, a front ground drive system, and a rear ground drive system. The front chassis portion includes a front chassis frame and a front axle assembly. The front axle assembly provides for a front axle housing and a front axle shaft, with the front axle shaft carrying a front wheel hub. The rear chassis portion similarly provides for a rear chassis frame and a rear axle assembly. The rear axle assembly includes a rear axle housing and a rear axle shaft, with the rear axle shaft carrying a rear wheel hub. The front chassis portion and the rear chassis portion are linked via an articulated joint. The front ground drive system constitutes, at least in part, a front track, a front drive wheel, a front idler wheel, and a front frame member. The front drive wheel is mounted to the front drive wheel hub, and the front idler wheel is mounted to the front axle housing via the front frame member, with the front idler wheel being located in front of the front drive wheel. Further, the front track is routed around at least 120 degrees of the front drive wheel, and a portion of the front track extends horizontally, relative to a bottom of the front chassis portion, between the rear drive wheel and the rear idler wheel. The rear ground drive system includes a rear track, a rear drive wheel, a rear idler wheel, and a rear frame member. The rear drive wheel is mounted to the rear drive wheel hub, and the rear idler wheel is mounted to the rear axle housing via the rear frame member. The rear idler wheel is located behind the rear drive wheel, and the rear track is routed around at least 120 degrees of the rear drive wheel. A portion of the rear track extends horizontally, relative to a bottom of the rear chassis portion, between the rear drive wheel and the rear idler wheel.

Tracks have been developed for an articulated steering off-highway vehicle or tractor. The following are desirable features for such a system to display:

Interchangeability with tires. Since this product will be sold with either tracks or tire-carrying wheels, it is advantageous for the machines to use a common design. This will allow for more efficient manufacturing, as well as for customers to easily convert equipment from tires to tracks or tracks to tires.

Ability to maintain current steering angle. Due to articulated steering, there is limited space between axles when the machine is turned. This limited space is what has led to the shape of the tracks.

Ability to maintain ground drive speed. Due to utilizing a common machine design, it is desirable for the drive sprocket to be rather close in diameter to the tire diameter in order to facilitate similar ground drive speeds.

Ability to keep machine width near that of a tire machine. Since this particular product may operate in narrow spaces, the tracks preferably should not extend beyond the width of the tires.

Ability to maintain ground clearance. In order to maintain functionality, the machine preferably should have nearly equivalent ground clearance whether equipped with tires or with tracks.

Ability to maintain approach angles. In order to maintain functionality, the machine preferably should have nearly equivalent approach angles, whether equipped with tires or with tracks.

The present track configuration may offer other potential advantages as well. The configuration provides needed ground contact to improve machine performance in finished yards and green spaces, as well as in soft or muddy conditions. Turf disturbance and rutting are kept to a minimum. This allows for the machine to be operated efficiently in a wider range of conditions than tires can offer. By having the track idler wheel extend beyond the machine, toward the distal/rear end of the machine, the performance of plowing and trenching is improved. Having the rear-most tracks closer to the plow and/or trencher can improve plowing and/or cutting action in the ground.

While portions of the present disclosure relate to a track configuration on a tractor with an articulated frame, the track configuration of the present disclosure can also be used on a tractor with a singular chassis frame. The track configuration of the present disclosure increases the space between the front and rear tracks on both articulated tractors and non-articulated tractors. Such space can be used to increase the turning radius of the tractor and/or accommodate an operator's station step while maintaining a generally short wheel base for the articulated and non-articulated tractor. Other advantages of having such a track configuration, mentioned above, are also applicable to the tractor with a non-articulated frame.

BRIEF DESCRIPTION OF THE DRAWINGS

FIG. 3 is a rear view of the off-highway work vehicle of FIG. 1 showing a width and a ground clearance for the vehicle;

FIG. 4 is a rear view of the off-highway work vehicle of FIG. 2 showing a ground clearance and width of the vehicle;

FIG. 5 is a perspective view of a ground drive system of the off-highway work vehicle of FIG. 1;

FIG. 6 is a top view of the ground drive system of FIG. 5;

FIG. 7 is a front view of the ground drive system of FIG. 5;

FIG. 10 shows an inboard side of one of the track assemblies of the ground drive system according to one embodiment of the present disclosure;

FIG. 11 is a partial cross-sectional view of the track assembly of FIG. 10;

DETAILED DESCRIPTION

In one example of the present disclosure, the overall machine may utilize a novel combination of a pair of generally tear-drop shaped track units, each having one larger diameter track drive roller/wheel and one smaller diameter track idler roller, with a track wrapped around these two rollers. The arrangement may use track drive rollers/wheels sized so that the effective drive diameter of the wheel and track is approximately the same diameter as a pneumatic tire/wheel combination used with a machine set up as a wheeled unit. The overall machine may have the wheels positioned as close as possible so that the overall machine size is minimized. Thus, diameter of the wheel is significant, and if it was larger, the wheels may interfere one with the other when the machine is steered. In positioning the idler rollers such that the idler roller of the front track unit is located at the front, and the idler roller of the rear track unit is located at the rear, it is possible to retain a comparable clearance relationship used with pneumatic tires to the inside, while allowing the track units to extend father towards the outsides to increase the ground contact area.

In an alternative embodiment, a triangular track unit may include a drive wheel and two idler rollers, with the idler rollers being positioned so that the outer perimeter of the track forms a right-angle, with one of the idler rollers positioned directly below the drive wheel. This arrangement may retain the benefit of keeping the distance between the track units equal to the distance between the pneumatic tires of a wheeled unit.

According to an aspect of the present disclosure, the idler rollers may be mounted to support shafts attached to an idler support frame that is rigidly mounted to the axle housing. One idler support frame may be mounted on each side/end of the axle housing, and a structural cross-member rigidly connects these two idler support frames, so that the two idler support frames and the structural cross-member form a unitary track unit frame. The track unit frame may be mounted to the axle housing for supporting the idler rollers. The track unit frame may not be connected to the drive wheel. The structural cross-member may not be aligned with the idler support shafts, which may be important in order to retain ground clearance.

The drive wheel/sprocket may be mounted to the drive axle in the same way that a standard wheel is mounted to the axle, while the idler roller may be mounted to a stub shaft supported by a track frame that is mounted to the axle housing. There is no track frame to which both rollers are mounted.

Figure 1:
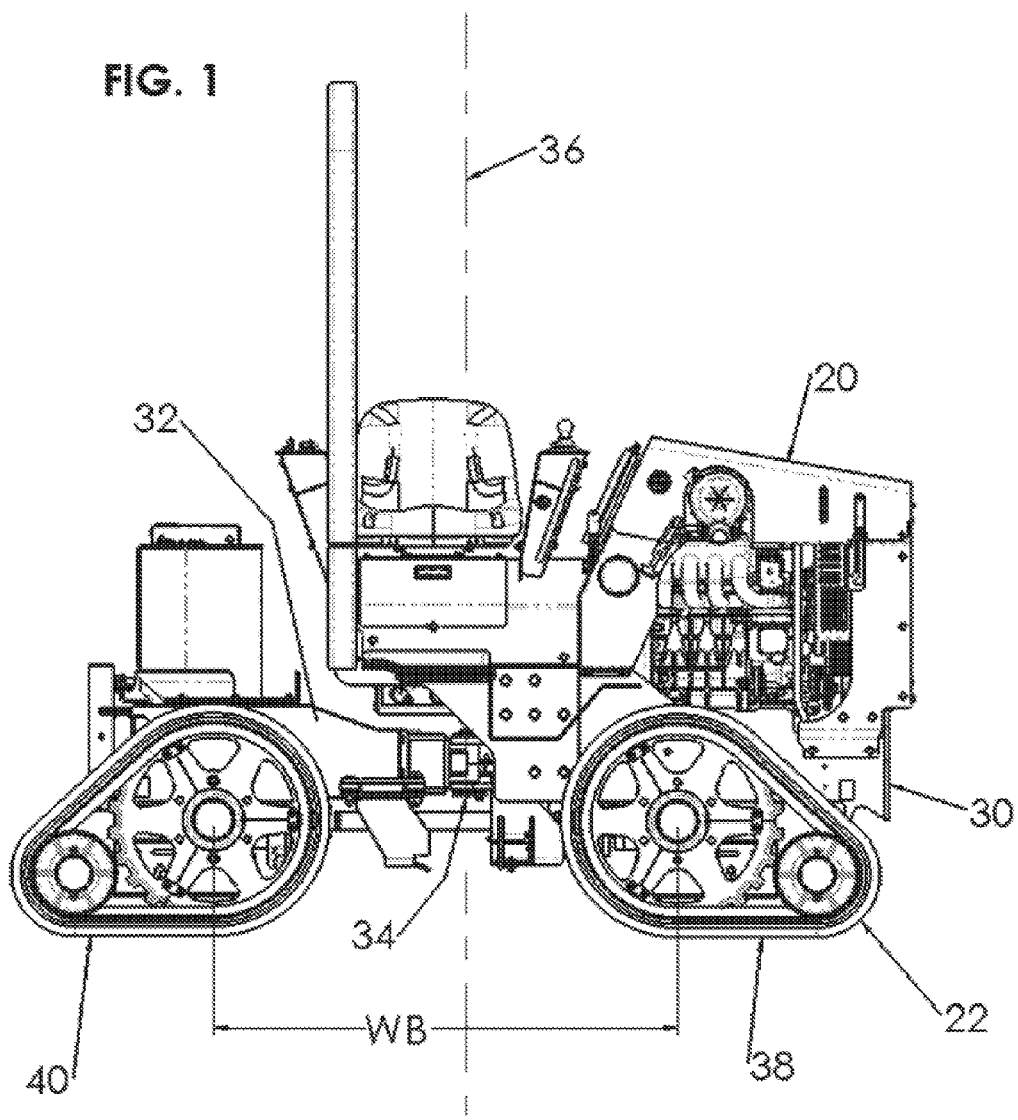
FIG. 1 is a side view showing an off-highway work vehicle having a track configuration in accordance with the principles of the present disclosure.
Figure 2:
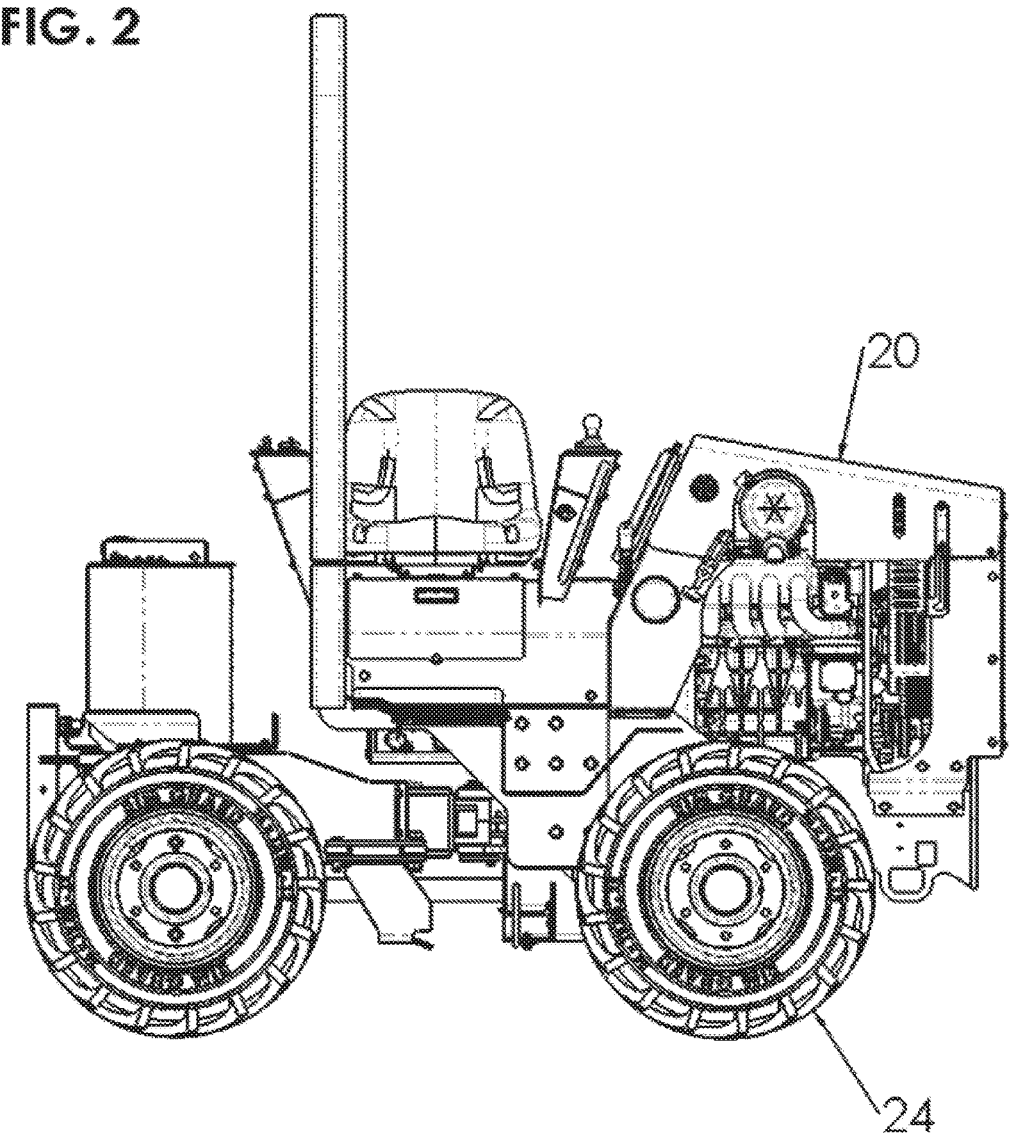
FIG. 2 is a side view showing the off-highway work vehicle of FIG. 1 equipped with pneumatic tires.

FIG. 1 illustrates an off-highway work vehicle 20 having a ground drive system that includes a track arrangement 22 in accordance with the principles of the present disclosure. The off-highway work vehicle 20 is configured to be equipped with either the track arrangement 22 of FIG. 1 or pneumatic tires 24 as shown in FIG. 2. In certain examples, the off-highway work vehicle 20 can have a wheel base WB that may be less than or equal to approximately 5 feet. For example, the wheel base may be about 4 feet. As shown at FIGS. 3 and 4, the off-highway work vehicle 20 has a ground drive system width W that may be generally the same regardless of whether the off-highway work vehicle 20 is equipped with the track arrangement 22 or the pneumatic tires 24. Additionally, the off-highway work vehicle 20 has a clearance C that is generally the same regardless of whether the off-highway work vehicle 20 is equipped with the track arrangement 22 or the pneumatic tires 24. It will be appreciated that manufacturing efficiency is enhanced by designing the off-highway work vehicle 20 to be compatible with either the track arrangement 22 or the pneumatic tires 24. In this way, it is not necessary to stock or manufacture different types of off-highway work vehicles for tracks as compared to the pneumatic tires. Based on customer preference, one type of off-highway work vehicle 20 can be equipped with either pneumatic tires 24 or the track arrangement 22 in the factory. It is also possible for the customer to switch between tracks and tires in the field depending upon environmental conditions or personal preference.

It will be appreciated that the track arrangement 22 is compatible with the same steering angles used for pneumatic tires. Due to articulated steering, the track arrangement 22 is configured to make use of very limited space between the front and rear axles when the machine is turned while concurrently providing a greatly increased ground contact area. It will be appreciated that the off-highway work vehicle 20 can operate at comparable ground speeds, regardless of whether it is equipped with the track arrangement 22 or the pneumatic tires 24. To achieve this, the drive wheels (e.g., drive sprockets) used in the track arrangement 22 may have generally the same diameter as the drive wheels on which the pneumatic tires 24 are mounted. The drive wheels may have a one-piece, or multi-piece design.

Figure 12:
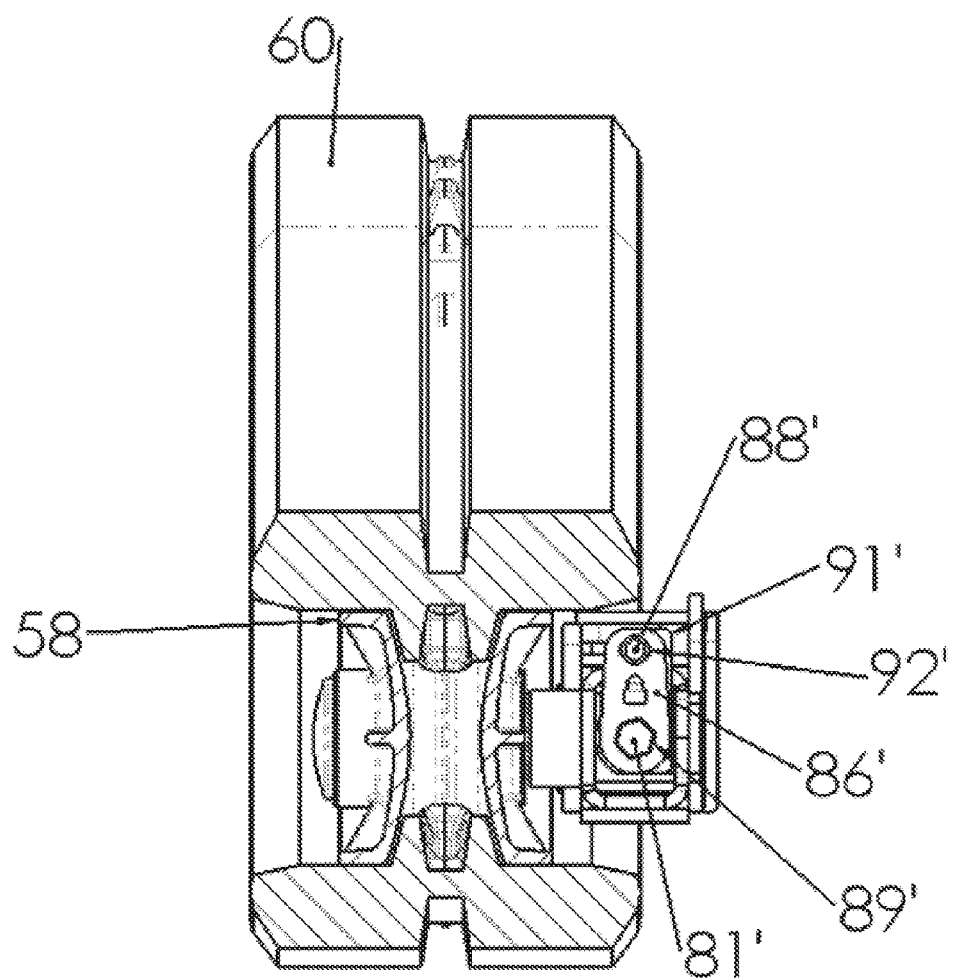
FIG. 12 is a partial cross-sectional view along line 12-12 of the track assembly of FIG. 10.

Referring to FIGS. 1 and 12, the off-highway work vehicle 20 includes a vehicle chassis having a front chassis frame 30 and rear chassis frame 32 linked via an articulated joint 34. The articulated joint 34 allows the front and rear chassis frames 30, 32 to pivot relative to one another about a generally vertical pivot axis 36 to allow for steering of the off-highway work vehicle 20. It will be appreciated that the off-highway work vehicle 20 can include a steering system including one or more actuators (e.g., drive cylinders) that selectively pivot the front and rear chassis frames 30, 32 relative to one another about the vertical pivot axis 36 to provide desired steering operations.

Figure 14:
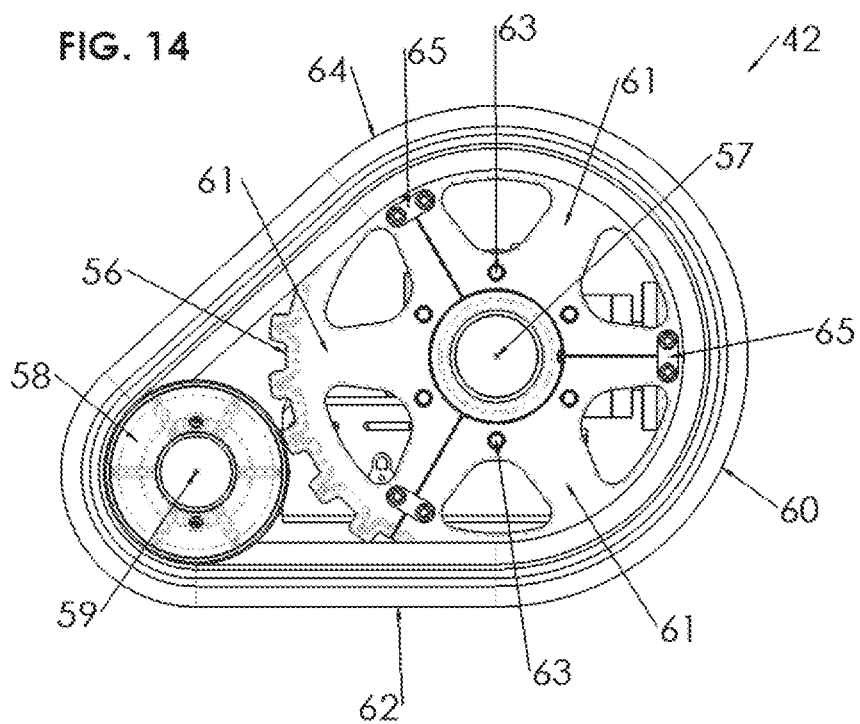
FIG. 14 illustrates a modified track assembly in accordance with the principles of the present disclosure, the track assembly including a segmented drive wheel (i.e., a segmented drive sprocket)
Figure 18:
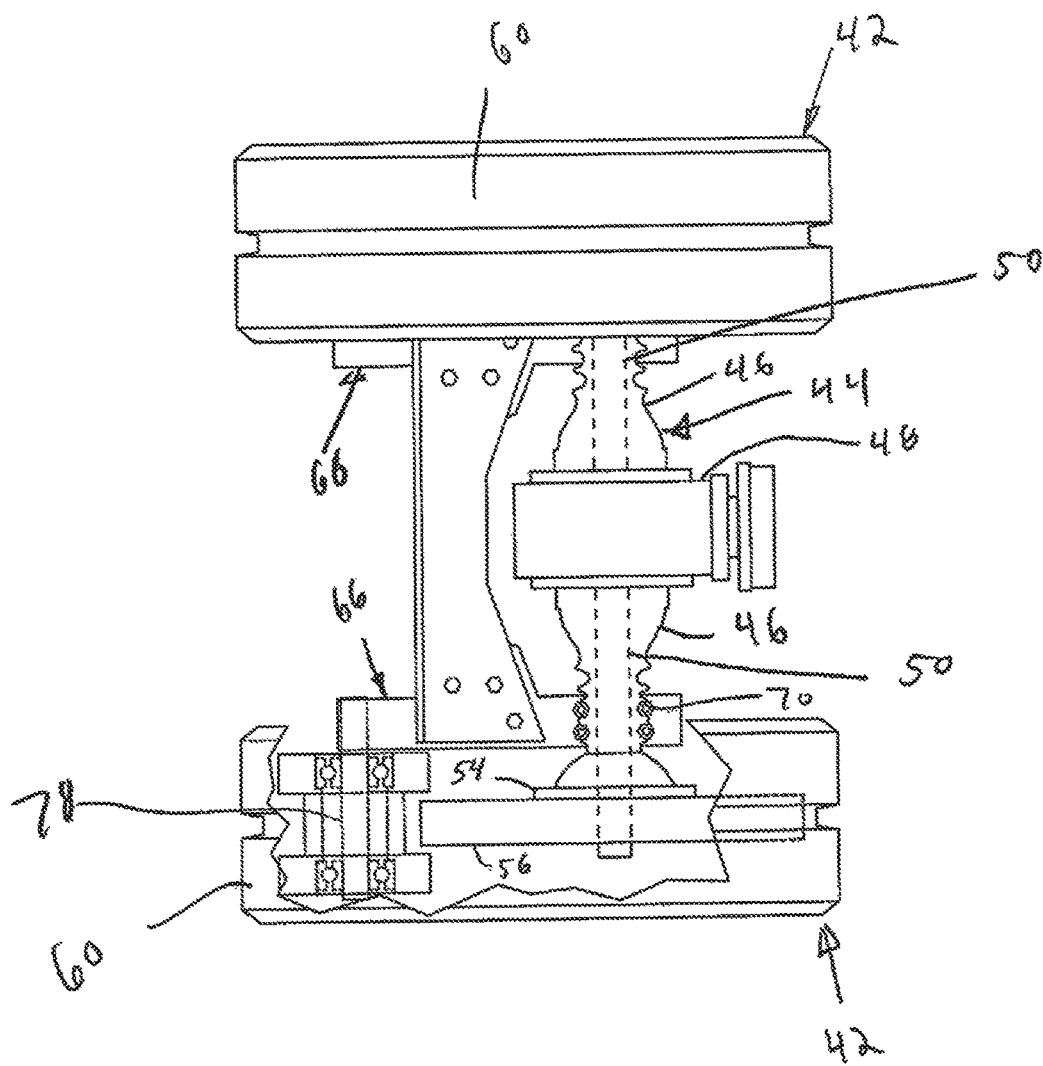
FIG. 18 is a partially cut-away view of one of the ground drive systems of FIG. 17.
Figure 19:
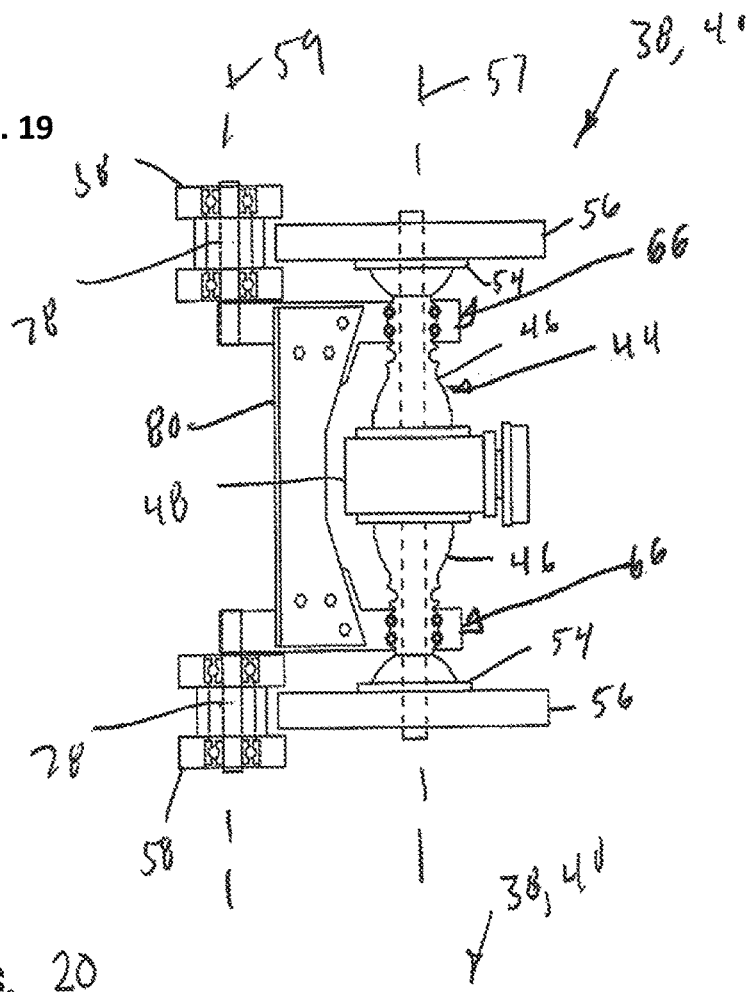
FIG. 19 is a top plan view of the ground drive system of FIG. 18, with the tracks removed.
Figure 20:
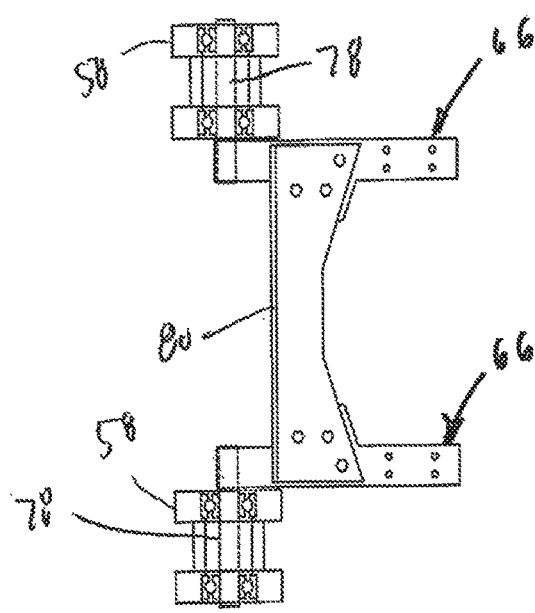
FIG. 20 is a top plan view of the drive system of FIG. 18, with the tracks and the axle assembly removed.

Referring still to FIGS. 1 and 12, the front and rear chassis frames 30, 32 are respectively supported on the front and rear ground drive systems 38, 40. As shown at FIG. 14, the front and rear ground drive systems 38, 40 may each include two track assemblies 42 positioned on opposite sides of the vehicle frame. Axle assemblies 44 are mounted between the track assemblies 42. Each axle assembly 44 includes axle housings 46 and differential housings 48 (FIGS. 5 and 7). Axles 50 extend through the axle housings 46 to the track assemblies 42 (FIG. 18). The differential housing 48 houses a differential for transferring torque from a drive shaft 52 to the axles 50. The axles 50 transfer torque to wheel hubs 54 (see FIG. 19). The axles 50 can be coupled directly to the wheel hubs 54 or can be connected to the wheel hubs 54 by gears such as planetary gears.

Referring to FIGS. 8-11, each of the track assemblies 42 includes a drive wheel 56 that couples to a corresponding one of the wheel hubs 54 by means such as fasteners (e.g., bolts). If is desired to equip the vehicle with pneumatic tires, rather than using the track compatible drive wheels 56, alternative drive wheels suitable for supporting the pneumatic tires would be fastened to the wheels hubs 54.

Each of the track assemblies 42 also includes an idler wheel 58 and a track 60 entrained about the drive wheel 56 and the idler wheel 58. In certain examples, the track 60 is a continuous track such as a continuous rubber track or a continuous steel track. It will be appreciated that the track 60 is driven by torque transferred from one of the axles 50 through the wheel hub 54 to the drive wheel 56. In certain examples, the drive wheel 56 can include a sprocket having teeth that engage an interior surface of the track 60. Thus, rotation of the drive wheel 56 causes the track 60 to rotate about a continuous path defined around the drive wheel 56 and the idler wheel 58.

Figure 8:
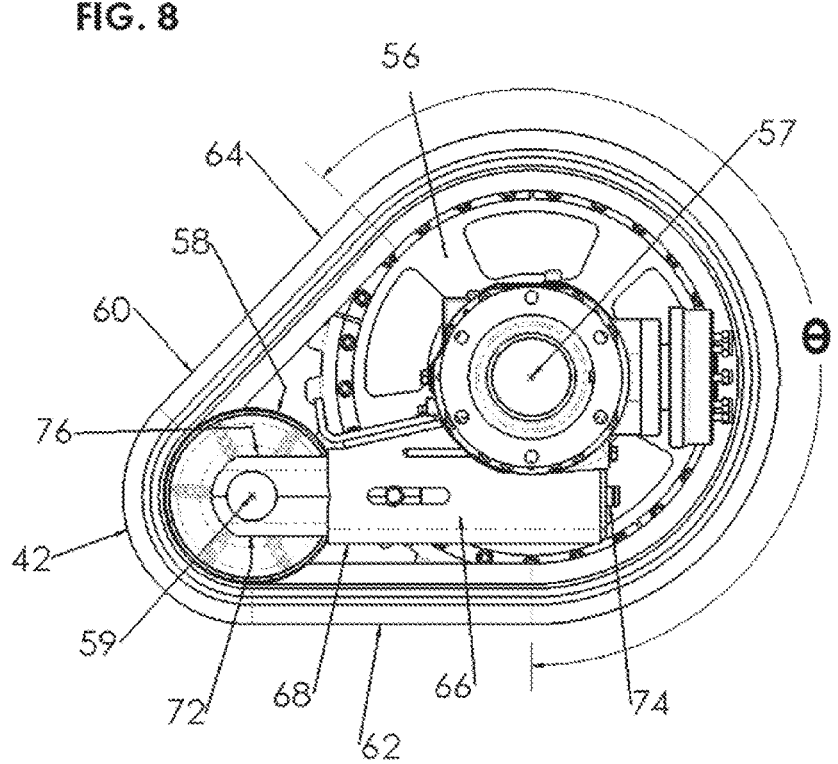
FIG. 8 shows an inboard side of one of the track assemblies of the ground drive system of FIG. 5.

Referring to FIG. 8, the track 60 is preferably routed around at least 120 degrees of the circumference of the drive wheel 56. In other examples, the track 60 is routed around at least 160 degrees of the circumference of the drive wheel 56. In the depicted example, the track 60 is routed around at least 180 degrees of the drive wheel 56 as shown by reference angle θ.

Still referring to FIGS. 8-11, the track 60 includes a ground engaging portion 62 that is shown extending horizontally between the drive wheel 56 and idler wheel 58. The track 60 also includes a non-ground engaging portion 64 that extends over the idler wheel 58 and over the top side of the drive wheel 56. The ground engaging portion 62 and the non-ground engaging portion 64 cooperate to define a continuous loop that extends around the idler wheel 58 and the drive wheel 56.

Figure 9:
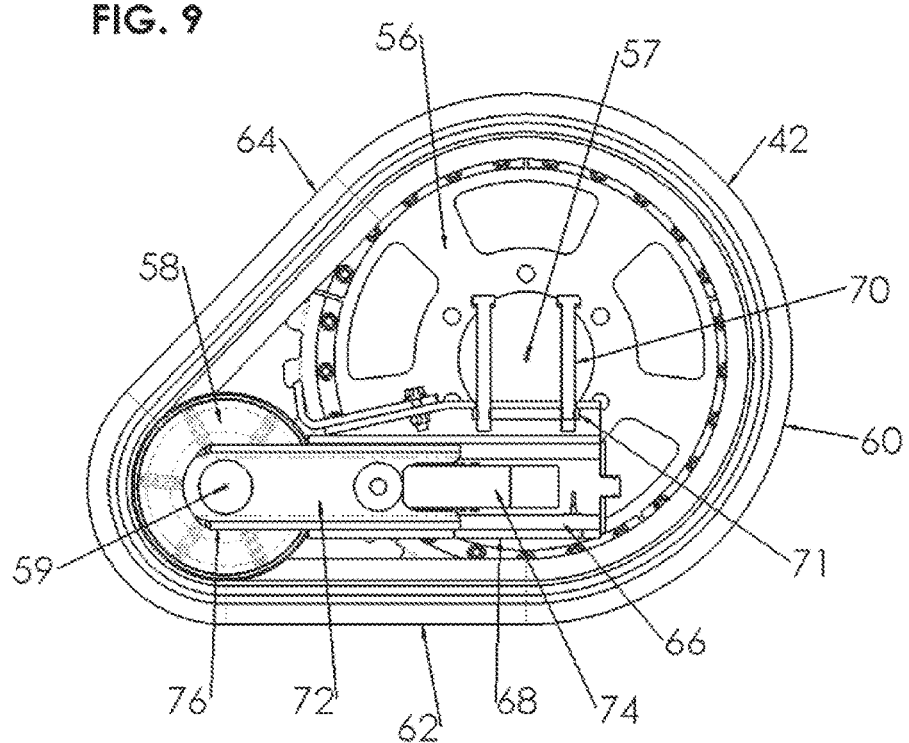
FIG. 9 is a partial cross-sectional view of the track assembly of FIG. 8.

Each of the track assemblies 42 also includes a track frame 66 that controls a spacing between an axis of rotation 59 of the idler wheel 58 and an axis of rotation 57 of the drive wheel 56. The track frame 66 includes a frame body 68 that is coupled to the axle housing 46. In certain examples, frame body 68 can be fixably connected to the axle housing 46 by fasteners, collars, brackets or other structures. As depicted at FIG. 9, fasteners 70 can be used to attach the frame body 68 to the axle housing 46. The fasteners 70 can be threaded into a fastening plate 71 within the frame body 68. Additionally, a top mounting plate (not shown) adjacent heads of the fasteners 70 can overlay a top side of the axle housing 46 such that the frame body 68 is effectively clamped to the axle housing 46.

The track frame 66 may also include an actuator 72 for adjusting the position between the axis of rotation 57 of the drive wheel 56 and the axis of rotation 59 of the idler wheel 58. In certain examples, the actuator 72 can include a linear actuator such as a drive cylinder. In certain examples, the drive cylinder can include a grease cylinder, a pneumatic cylinder, or a hydraulic cylinder. The actuator 72 can include a cylinder 74 fixed relative to the track frame 66 or integral with the track frame 66. The actuator 72 also includes a piston rod 76 that extends outwardly from the cylinder 74 when actuated. The piston rod 76 includes a free end coupled to an idler axle 78 on which the idler wheel 58 is rotationally mounted. In the depicted example, the idler axle 78 has a cantilevered configuration. The piston rod 76 is coupled to an inboard end of the idler axle 78, while the idler wheel 58 is rotationally mounted on an outboard portion of the idler axis 78 by means such as bearings.

FIGS. 10-11 show an alternative track tensioning system. The system utilizes a threaded tension screw 72' that is attached to a tensioning arm 76'. The tensioning arm 76' is movable within a tensioning arm receiver 74' that is positioned within a frame 66'. At one end, the tensioning arm 76' is coupled to the idler wheel 58 and uncoupled at an opposite end. At a first end 78' of the tension screw 72', the tension screw 72' is fixed to an adjustment nut 80' which is affixed to the tensioning arm 76'. The adjustment nut 80' includes a tool end 81' that is configured to receive an adjusting tool, such as a wrench. In some embodiments, the tool end 81' has a hexagonal cross-section. In some embodiments, the adjustment nut 80' is welded to the tension screw 72'. The adjustment nut 80' allows the tensioning arm 76' to move in axial directions with the tension screw 72'. At a second end 82', the tension screw 72' is threaded into a tension block 84' that is positioned within the frame 66'. Therefore, rotating the adjustment nut 80' causes the tension screw 72' to thread or unthread into the tension block 84'. Such threading facilitates the movement of the tensioning arm 76' axially within the tensioning arm receiver 74' of the frame 66'. The movement of the tensioning arm 76' adjusts the distance between the axis of rotation 57 of the drive wheel 56 and the axis of rotation 59 of the idler wheel 58, thereby altering the tension of the track 60.

As shown in FIG. 10, the track tensioning system also includes a side tension lock 85'. The side tension lock 85' may be configured to interface with a track frame 66' and pass through tensioning arm 76' to lock the tensioning arm 76' in position with the frame 66'.

Also shown in FIGS. 10-12 is a tension screw 72' locking system. The system includes a locking plate 86', a locking washer 87' and a locking bolt 88'. The locking plate 86' includes an aperture 89' that is configured to fit over the tool end 81' of the adjustment nut 80'. In some embodiments, the aperture 89' has a hexagonal shape. The locking plate 86' also includes a locking bolt aperture 92' for receiving the locking bolt 88'. Further, the locking washer 87' is configured to be positioned around the adjustment nut 80', behind both an end face 90' of the tensioning arm 76' and the tool end 81' of the adjustment nut 80'. The locking washer 87' includes a tab 91' that is configured to receive the locking bolt 88'. In some embodiments, the locking washer tab 91' protrudes from the tensioning arm 76' and is prevented from rotating about the adjustment nut 80'. To prevent rotation of the adjustment nut 80', and, therefore, the tension screw 72', the locking plate 86' and the locking washer 87' are secured together by the locking bolt 88'. The locking bolt 88' passes through the locking bolt aperture 92' and the locking washer tab 91'. As shown in FIG. 12, when secured in place, the size of the locking plate 86' helps to prevent rotating of the adjustment nut 80'.

To change the tension of the track 60, a user must first remove the side tension lock 85' and then remove the locking plate 86' from the tool end 81' of the adjustment nut 80'. At such a point, the tensioning arm 76' is free to move within the tensioning arm receiver 74'. To increase the tension in the track, a tool is attached to the tool end 81' of the adjustment nut 80' and rotated so as to unthread the tension screw 72' from the tension block 84'. As the tension screw 72' is turned so as to move in an unthreading (i.e., loosening) direction, the tension screw 72' moves the idle wheel 58 away from the drive wheel 56 by way of the tensioning arm 76'. Alternatively, movement in the threading (i.e., tightening) direction of the tension screw 72' would cause the idle wheel 58 to move toward the drive wheel 56, via the tensioning arm 76'. Once a desired tension on the track 60 is achieved, the side tension lock 85' is installed along with the locking plate 86' so as to secure the tension screw 72' in place to prevent an accidental changing of the tension of the track 60.

In some embodiments, the adjustment nut 80' is a bearing that secures the tension screw to the tensioning arm 76' but allows the tension screw 72' to rotate within the adjustment nut 80'. In such an embodiment, the tension screw 72' can be rotated at the second end 82' to control the movement of the piston rod 76' with respect to the tensioning arm receiver 74'.

Figure 13:
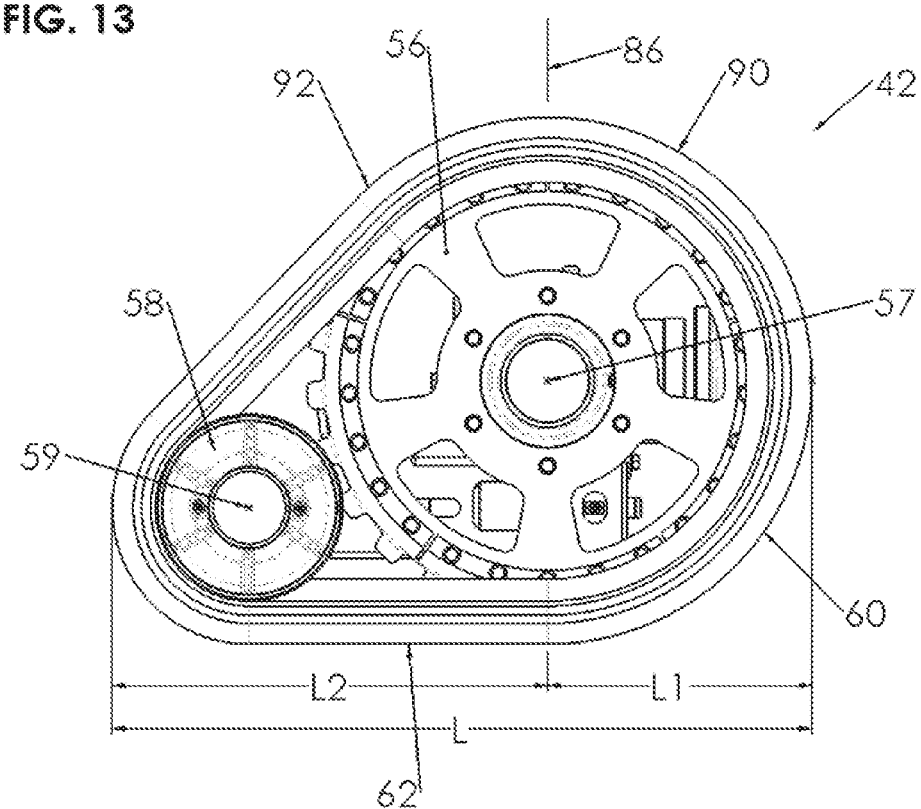
FIG. 13 shows an outboard side of the track assembly of FIG. 8.

FIG. 13 shows an outside view of the track assembly 42. As shown, the drive wheel 56 may be a solid drive wheel. Alternatively, FIG. 14 shows a drive wheel 56 having wheel segments 61. The wheel segments 61 are each individually removable and aid in the replacement process of the track 60 when the track assembly 42 is mounted to a machine. The wheel segments 61 allow for the user to keep the idler wheel 58 installed in place in the track assembly and remove a singular or pair of wheel segments 61 from the drive wheel 56. Such removal of wheel segments 61 allows the track 60 to be removed. In the depicted embodiment, each segment 61 includes a pair of holes 63 that are configured to allow the wheel segments 61 to be mounted to a hub. Additionally, wheel segment plates 65 are used to secure each wheel segment 61 to one another so as to improve the rigidity of the drive wheel 56 when all wheel segments 61 of a given drive wheel 56 are installed.

Figure 15:
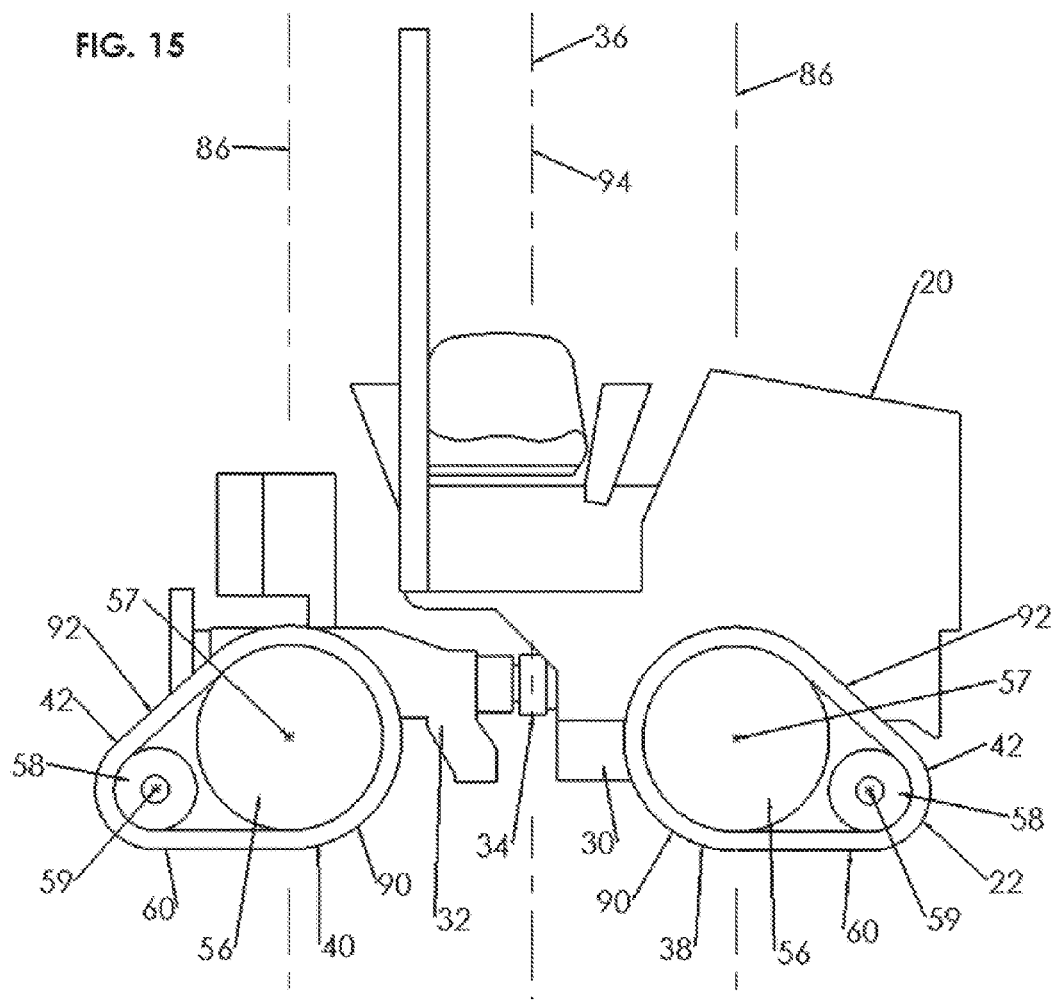
FIG. 15 is a schematic side view of the off-highway work vehicle of FIG. 1.

Referring to FIGS. 13-15, each of the track assemblies 42 is shown defining a length L measured in a horizontal orientation. The length L of the track assemblies 42 of the rear ground drive system 40 extends rearwardly beyond a rearmost end of the vehicle frame of the off-highway work vehicle 20. It shall be understood that the ability of the track assemblies 42 to extend rearward of the vehicle frame is advantageous for providing stability during operations such as plowing and trenching. The use of tracks in general assists in providing an enlarged contact area that improves performance in finished yards and green spaces, as well as in soft or muddy conditions. For example, turf disturbance and rutting are kept to a minimum. This allows for the machine to be operated efficiently in a wider range of conditions than tires can offer. This improved performance is provided, at least in part, by the relatively long configuration of the ground engaging portions 62.

Referring now to FIG. 13, a vertical reference plane 86 is shown intersecting the axis of rotation 57 of the drive wheel 56. The track assemblies 42 are configured such that a minor portion 90 of each track assembly 42 is positioned on one side of the vertical reference plane 86, while a major portion 92 is positioned on an opposite side of the vertical reference plane 86. The minor portion 90 corresponds to a length L1, while the major portion 92 corresponds to a length L2. The lengths L1 and L2 cooperate to define the total length L of the track assembly 42. The length L2 is preferably greater than the length L1. In certain examples, the length L2 is at least 55% of the total length L. In other examples, the length L2 is at least 60% of the total length L or at least 65% of the total length L. In one example, the length L2 is at least 1.5 times as large as the length L1.

Figure 16:
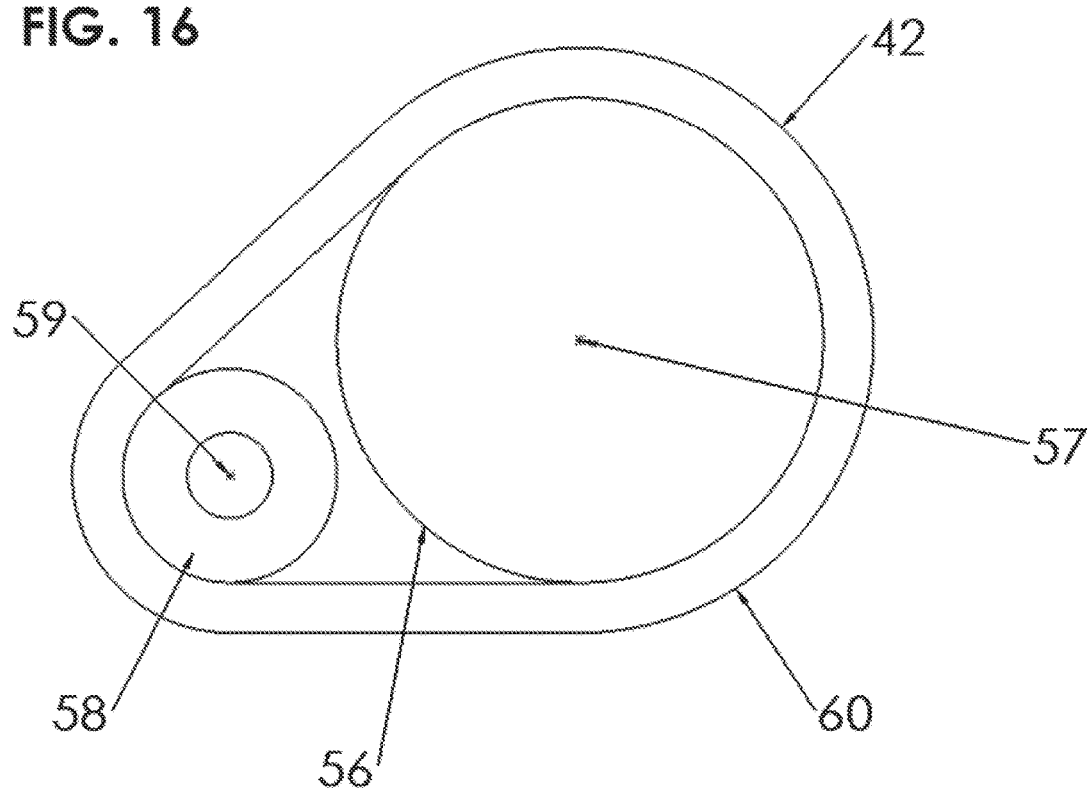
FIG. 16 is a side view of one of the track assemblies of FIG. 15.
Figure 17:
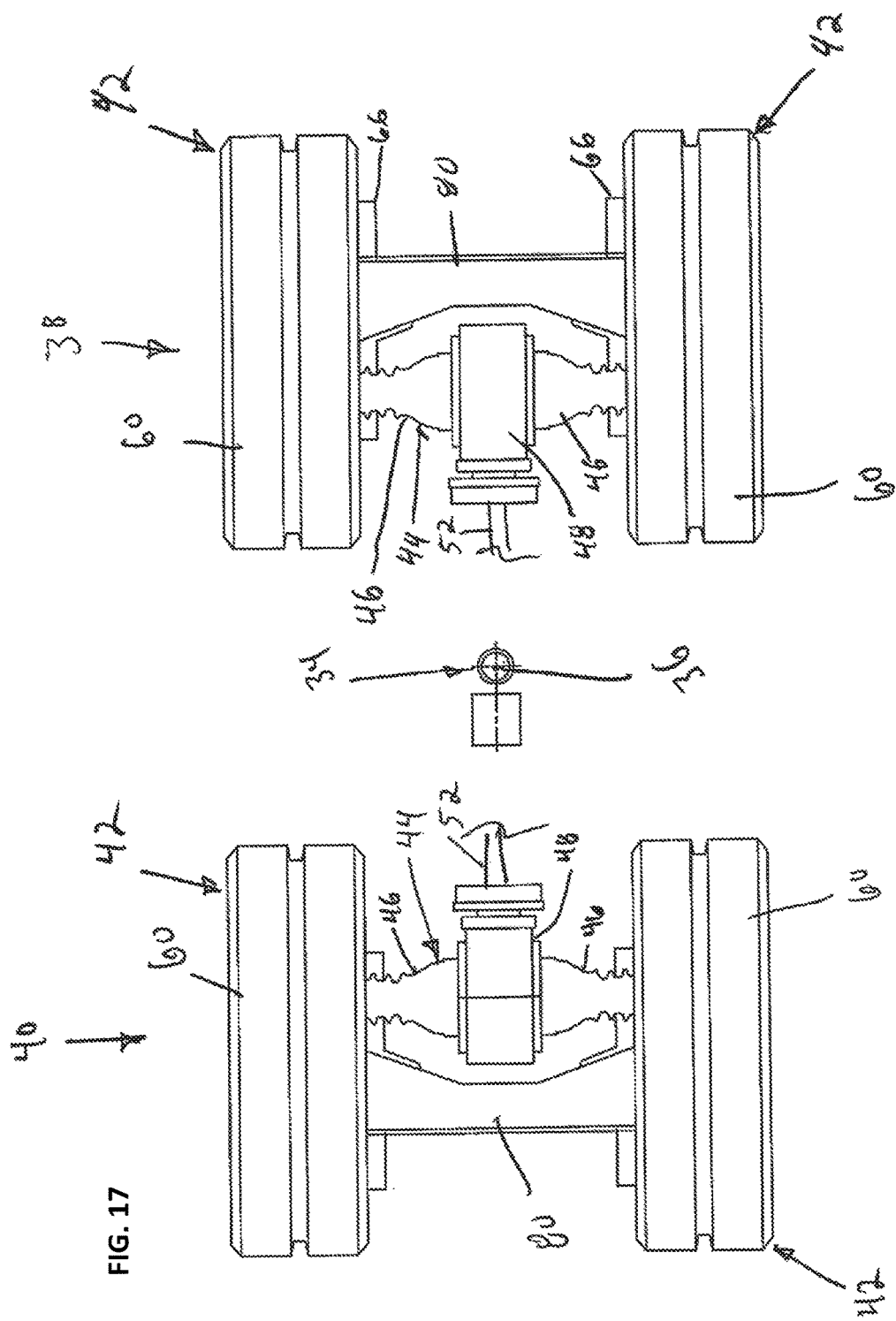
FIG. 17 is a top plan view showing front and rear ground drive systems of the off-highway work vehicle of FIG. 15.

Referring to FIG. 15, the front ground drive system 38 may be configured such that the minor portions 90 of the track assemblies 42 are positioned rearward of the corresponding vertical reference plane 86, while the major portions 92 are positioned forward of the corresponding vertical reference plane 86. As shown at FIG. 15, a lateral plane 94 is shown intersecting the pivot axis 36 of the articulation joint 34. The lateral plane 94 extends across a width of the off-highway work vehicle 20. The minor portions 90 of the track assemblies 42 of the front ground drive system 38 are positioned closer to the lateral plane 94 than the major portions 92 of the track assemblies 42 of the front ground drive systems 38. And the track assemblies 42 of the rear ground drive system 40 may be oriented with the minor portions 90 positioned forwardly with respect to the corresponding vertical reference plane 86 and with the major portions 92 positioned rearwardly with respect to the corresponding vertical reference plane 86. Thus, for the rear ground drive system 40, the minor portions 90 of the track assemblies 42 are also positioned closer to the lateral plane 94 than the major portions 92 of the track assemblies 42. This type of configuration may assist in preventing interference between the track assemblies 42 of the front and rear ground drive systems 38, 40, respectively, during turning while also providing relatively large ground contact areas. FIG. 16 shows a single track assembly, schematically.

FIGS. 17-20 illustrate the frame bodies 68 of each of the ground drive systems 38, 40 which may be interconnected by a cross-support member 80 that extends across the width of the vehicle frame. The cross-support member 80 may be offset from the axis of rotation 57 of the drive wheel 56 and may also be offset from the axis of rotation 59 of the idler wheels 58. Thus, the cross-support member 80 may be a separate structure from the axle assembly 44 and mechanically couples the track frames 66 at a fixed lateral spacing relative to one another. In certain examples, the cross-support member 80 has a length that extends along the lengths of the axes of rotation 57, 59. In certain examples, the cross-support member 80 couples to the frame bodies 68 at locations between the axis of rotation 57 of the drive wheel 56 and the axis of rotation 59 of the idler wheels 58. In certain examples, the cross-support member 80 forms a rigid connection between the track frames 66 of the ground drive systems 38, 40.

Figure 21:
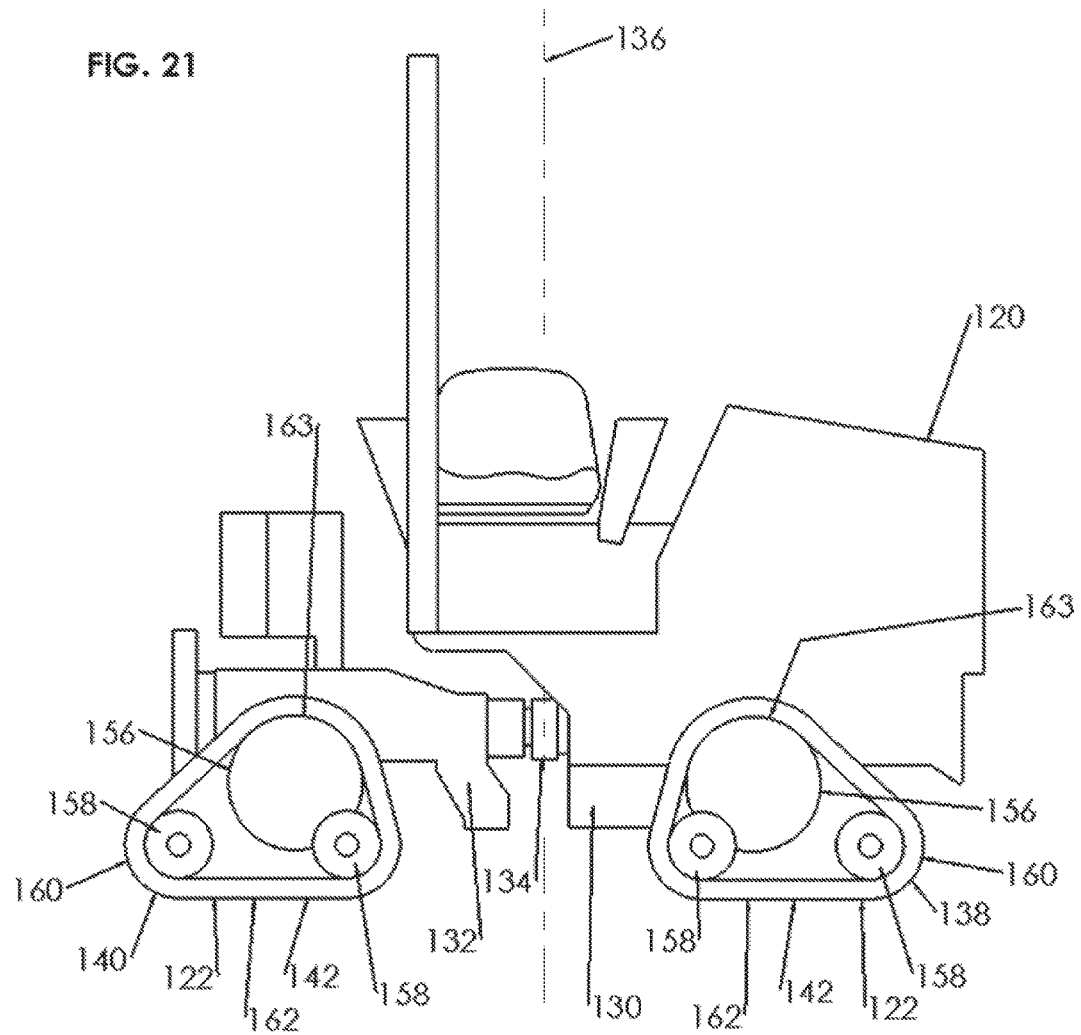
FIG. 21 is a side view of another off-highway work vehicle having an alternative track arrangement in accordance with the principles of the present disclosure.
Figure 22:
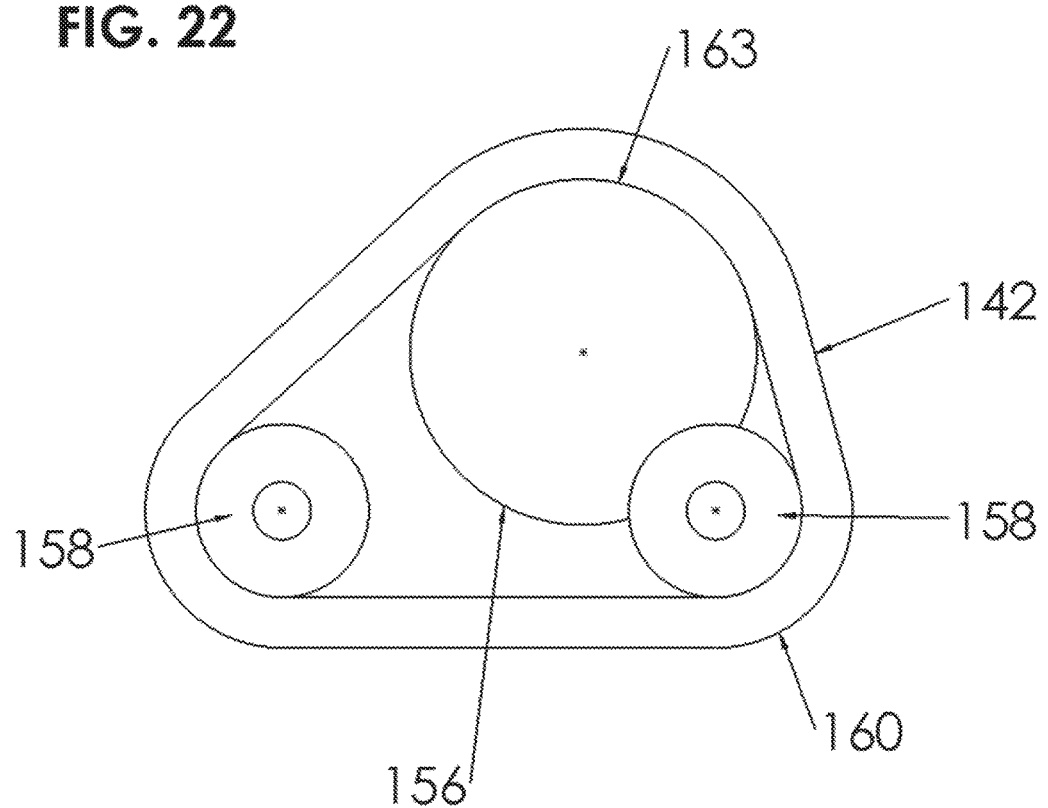
FIG. 22 is a side view showing one of the track assemblies of the off-highway work vehicle of FIG. 21.
Figure 23:
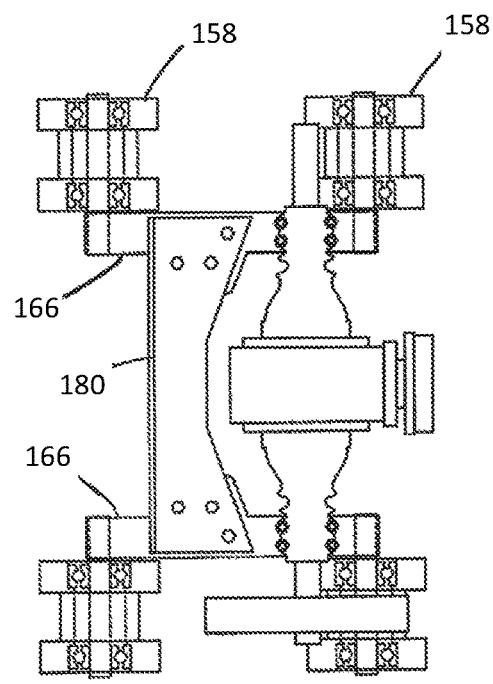
FIG. 23 is a top plan view of a ground drive system of the off-highway work vehicle of FIG. 21, with the tracks removed.
Figure 24:
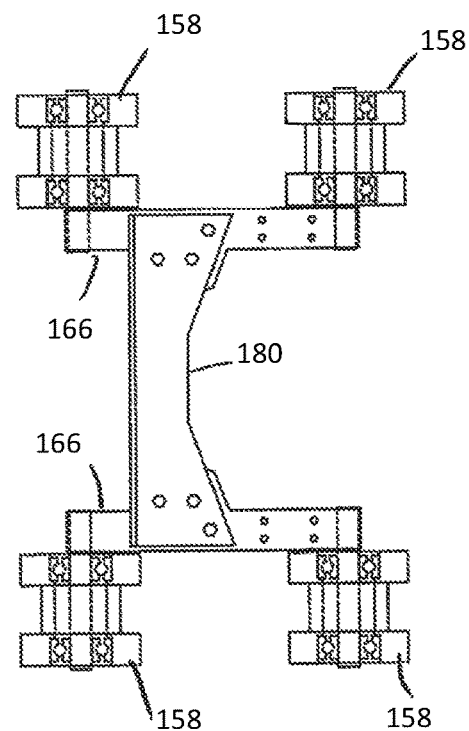
FIG. 24 is a top plan view of the ground drive system of FIG. 23, with the axle assembly removed.

FIG. 21 shows another off-highway work vehicle 120 having a track arrangement 122 in accordance with the principles of the present disclosure. The off-highway work vehicle 120 has a similar configuration to the off-highway work vehicle 20 and includes a front chassis frame 130 pivotally connected to a rear chassis frame 132 at an articulator joint 134. The articulator joint 134 defines a pivot axis 136 about which the front and rear chassis frames 130, 132 fit relative to one another. The track arrangement 122 includes front and rear ground drive systems 138, 140 that respectively support the front and rear chassis frames 130, 132. The front and rear ground drive systems 138, 140 are similar to the front and rear ground drive systems 38, 40 previously described, except the front and rear ground drive systems 138, 140 include track assemblies 142 having two idler wheels 158 (shown in FIG. 22). The idler wheels 158 are supported by a track frame 166 (shown in FIGS. 23-24). At least one of the idler wheels 158 can be movable relative to a corresponding drive wheel 156 to allow for tightening of a corresponding track 160 entrained about the drive wheel 156 and the idler wheels 158. An actuator such as a linear actuator can be housed within the track frame 166 and used to move a corresponding one of the idler wheels 158 to tighten the track 160. The track frames 166 of each of the drive systems 138, 140 are rigidly connected together by a cross-support member 180 that extends across a width of the off-highway work vehicle 120. The idler wheels 158 are rotatably mounted on idler axles having cantilevered configurations relative to their corresponding track frames 166. The tracks 160 include ground engaging portions 162 that are generally horizontal and that extend between the idler wheels 158. The tracks 160 also include wheel engaging portions 163 that coincide with at least 120 degrees of the circumference of the drive wheel 156. Similar to the track arrangement 22, the track arrangement 122 is configured such that minor portions of the track assemblies are positioned closer to the articulated joint 134 than major portions of the track assemblies 142. Thus, the track assemblies 142 can be configured to provide a relatively large ground contacting area while still avoiding interference between the front and rear sets of tracks when the vehicle frame is articulated during turning.

Figure 25:
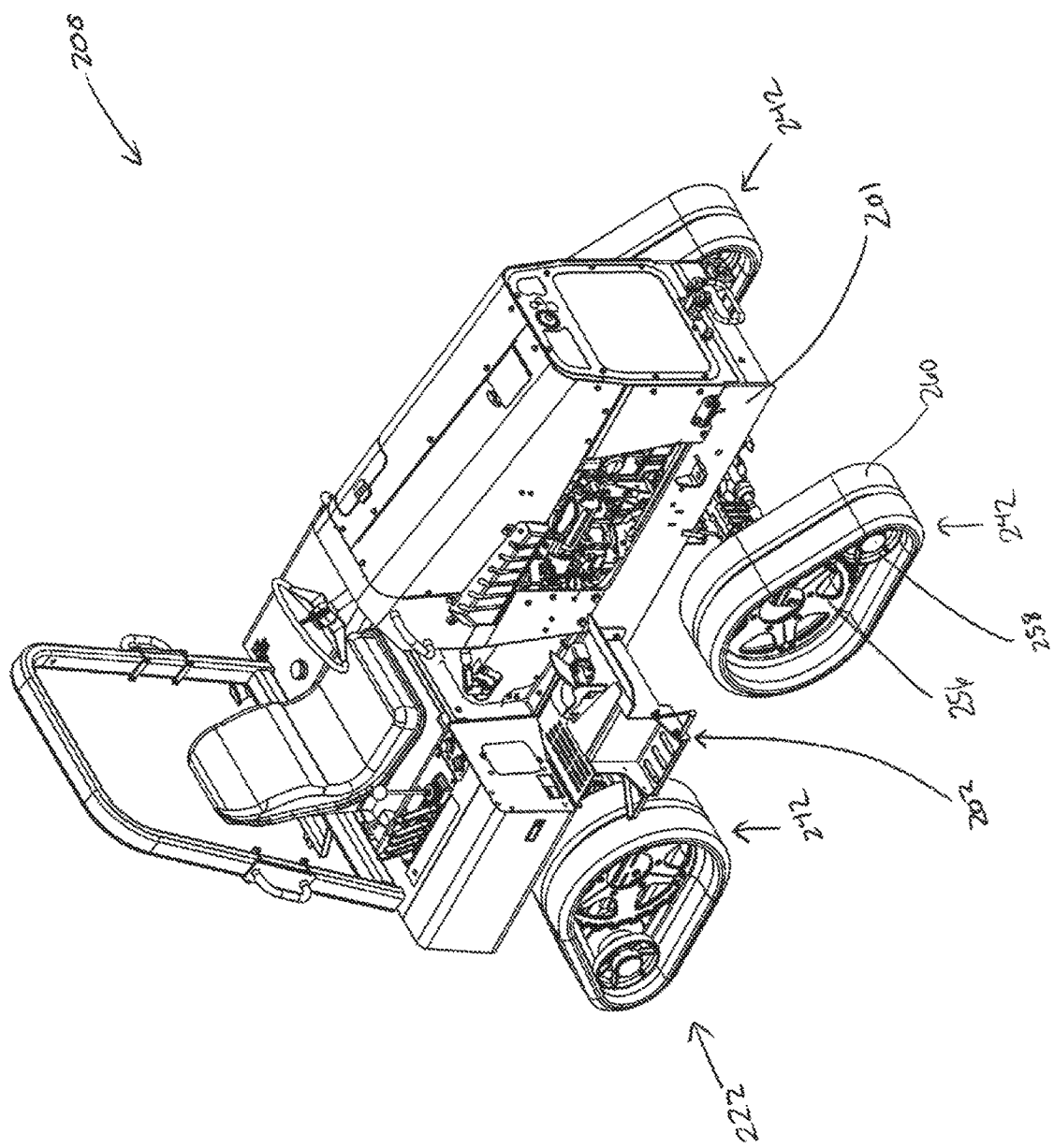
FIG. 25 is a perspective view showing an off-highway work vehicle having a track configuration in accordance with the principles of the present disclosure.
Figure 26:
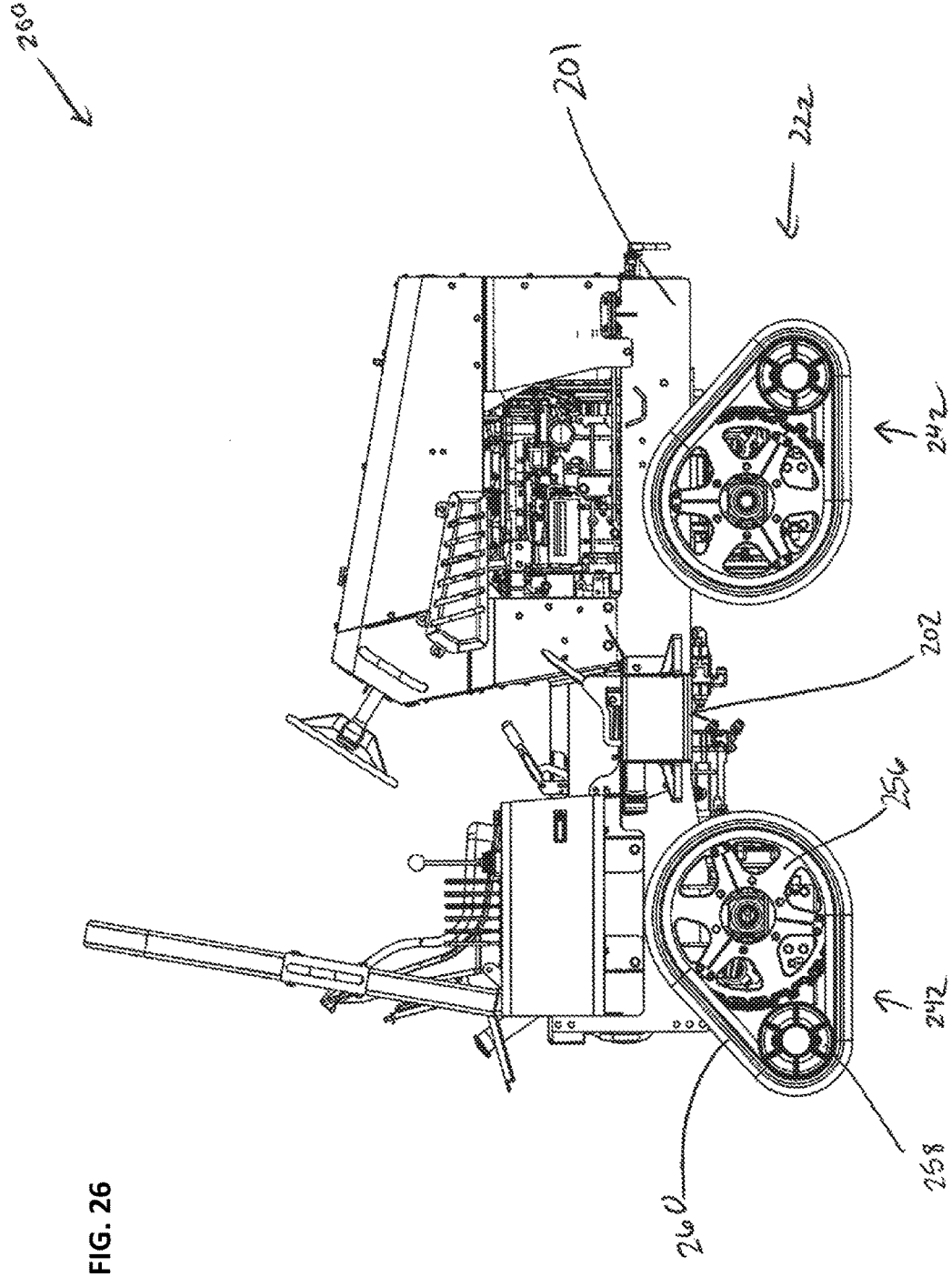
FIG. 26 is a side view of the off-highway work of FIG. 25.
Figure 27:
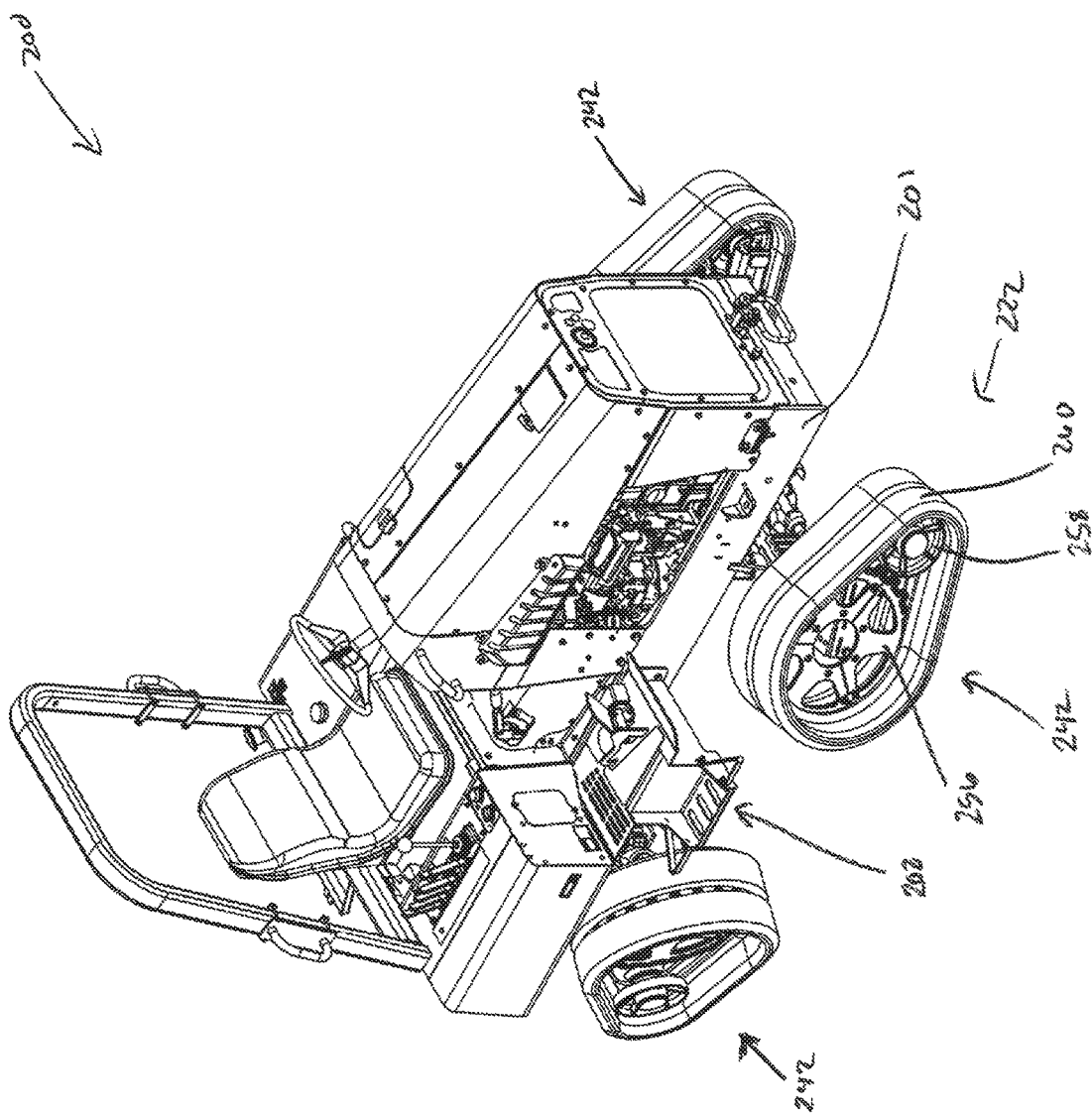
FIG. 27 is a perspective view showing the off-highway work vehicle of FIG. 25 with steerable tracks.

FIGS. 25-26 illustrate an off-highway work vehicle 200 having a ground drive system that includes a track arrangement 222. The track arrangement 222 includes two pairs of track assemblies 242 positioned on opposite sides of the off-highway work vehicle 200. As shown, the track assemblies 242 have a similar configuration to the track assemblies 42 described above. Each track assembly includes a drive wheel 256, an idler wheel 258, and a track 260 that is preferably routed around at least 120 degrees of the circumference of the drive wheel 256. The off-highway work vehicle 200 is also substantially similar to the off-highway work vehicle 20 described above, having a similar wheel base and clearance. However, the off-highway work vehicle 200 utilizes a singular chassis frame 201 with a steerable track (as shown in FIG. 27) instead of the articulated chassis frame of the off-highway work vehicle 20. Specifically, the track assemblies 242 can be attached to the off-highway work vehicle 200 in a variety of different ways. An example is shown in U.S. Pat. No. 8,430,188 where a system for converting a wheeled vehicle to a tracked vehicle is disclosed. Another application is described in U.S. Pat. No. 8,245,800 describing track assemblies that may be used to convert a self-propelled tire or wheel supported vehicle to self-propelled multi-track vehicle. U.S. Pat. Nos. 8,430,188 and 8,245,800 are hereby incorporated by reference in their entireties.

The off-highway work vehicle 200 with steerable track assemblies 242 allows a step 202 to be mounted to the chassis frame 201 between the two pairs of track assemblies 242. The step 202 can be a fixed step or an extendable step that is operated by the operator when needed. The step 202 allows the operator easier access to the operator's station of the off-highway work vehicle 200.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An off-highway vehicle, comprising:
   a front chassis portion comprising a front axle assembly, the front axle assembly including a front axle housing and a front axle shaft, the front axle shaft carrying a front wheel hub;
   a rear chassis portion comprising a rear axle assembly, the rear axle assembly including a rear axle housing and a rear axle shaft, the rear axle shaft carrying a rear wheel hub;
   a front ground drive system comprising a front drive wheel, a front idler wheel, and a front drive frame member, the front drive wheel mounted to the front wheel hub, wherein the front idler wheel is mounted to the front axle housing via the front drive frame member and the front idler wheel is located in front of the front drive wheel; and
   a rear ground drive system comprising a rear drive wheel, a rear idler wheel, and a rear drive frame member, the rear drive wheel mounted to the rear wheel hub, wherein the rear idler wheel is mounted to the rear axle housing via the rear drive frame member and the rear idler wheel is located behind the rear drive wheel;
   wherein at least one of the front drive frame member and the rear drive frame member is respectively non-rotatably mounted relative to the corresponding front axle housing and the corresponding rear axle housing.

2. The off-highway vehicle of claim 1, wherein at least one of the front wheel hub and the rear wheel hub is configured to selectively carry either a corresponding drive wheel for use with a respective ground drive assembly or a separate tire-carrying wheel assembly.

3. The off-highway vehicle of claim 2, wherein at least one of an overall width and a ground clearance of the off-highway vehicle is substantially the same with the respective ground drive assembly or tire-carrying wheel assembly.

4. The off-highway vehicle of claim 1, wherein the front chassis portion and the rear chassis portion are linked via an articulated joint.

5. The off-highway vehicle of claim 4, wherein the articulated joint has a maximum turn angle associated therewith, the front ground drive system maintaining a clearance from the rear ground drive system when the articulated joint is at the maximum turn angle in a given direction.

6. The off-highway vehicle of claim 1, wherein:
   the front ground drive system further comprises a front track, the front track being routed around at least 120 degrees of the front drive wheel, a portion of the front track extending horizontally relative to a bottom of the front chassis portion between the front drive wheel and the front idler wheel; and
   a rear track, the rear track being routed around at least 120 degrees of the rear drive wheel, a portion of the rear track extending horizontally relative to a bottom of the rear chassis portion between the rear drive wheel and the rear idler wheel.

7. The off-highway vehicle of claim 6, wherein at least one of the front track and the rear track is respectively routed around at least 180 degrees of the corresponding front drive wheel and the corresponding rear drive wheel.

8. The off-highway vehicle of claim 6, further comprising a track tensioning system configured to alter the distance between the front idler wheel and the front drive wheel to control the tension of the front track.

9. The off-highway vehicle of claim 1, wherein at least one of the front drive wheel and the rear drive wheel is comprised of a drive sprocket.

10. The off-highway vehicle of claim 9, wherein the wheel assembly comprises a tire associated therewith, the tire having a corresponding tire diameter and a respective drive sprocket having a corresponding sprocket diameter, the tire diameter being substantially the same as the given sprocket diameter.

11. The off-highway vehicle of claim 1, wherein the front ground drive system defines a first front ground drive system, a second front ground drive system, and a front structural cross-member, wherein:

the first front ground drive system comprises a first front track, a first front drive wheel, a first front idler wheel, and a first front drive frame member;

the second front ground drive system comprises a second front track, a second front drive wheel, a second front idler wheel, and a second front drive frame member; and the front structural cross-member is connected to both of the first and second front drive frame members.

12. The off-highway vehicle of claim 1, wherein a distance between the front axle shaft and the rear axle shaft defines a wheel base of the off-highway vehicle, the wheel base being less than 5 feet.

13. The off-highway vehicle of claim 1, wherein the track tensioning system includes one of:

a hydraulic cylinder attached to the front idler wheel and the front drive frame member, wherein the hydraulic cylinder includes an extendable arm configured to alter the distance between the front idler wheel and the front drive wheel; and a threaded cylinder attached to the front idler wheel and threaded into the front drive frame member, wherein the threaded cylinder is configured to alter the distance between the front idler wheel and the front drive wheel upon threading and unthreading into and out of the front drive frame member.

14. The off-highway vehicle of claim 1, further comprising a step mounted to the vehicle frame between the front chassis portion and the rear chassis portion.

15. An axial-based transmission system for an off-highway vehicle, the transmission system comprising:

an axle assembly including an axle housing and an axle shaft, the axle shaft having a first axle end and a second axle end, the first axle end and the second axle end each carrying a respective wheel hub;

a first ground drive system comprising a first track, a first drive wheel, a first idler wheel, and a first drive frame member, the first drive wheel mounted to the first axle end wheel hub, the first idler wheel mounted to the first axle housing via the first drive frame member, the first idler wheel being positioned proximate the first drive wheel, the first track being routed around at least 120 degrees of the first drive wheel, a portion of the first track extending horizontally between the first drive wheel and the first idler wheel and thereby configured to be ground engaging;

a second ground drive system comprising a second track, a second drive wheel, a second idler wheel, and a second drive frame member, the second drive wheel mounted to the second axle end wheel hub, the second idler wheel mounted to the second axle housing via the second drive frame member, the second idler wheel being positioned proximate the second drive wheel, the second track being routed around at least 120 degrees of the second drive wheel, a portion of the second track extending horizontally between the second drive wheel and the second idler wheel and thereby configured to be ground engaging; and a cross-support member extending between and interconnecting the first drive frame member and the second drive frame member, the cross-support member forming a rigid connection between the first drive frame member and the second drive frame member.

16. The axial-based transmission system of claim 15, wherein the first idler wheel has a first idler wheel shaft associated therewith, the second idler wheel having a second idler wheel shaft associated therewith, the cross-support member being positioned and mounted so as to not axially link the first idler wheel shaft with the second idler wheel shaft.

17. The axial-based transmission system of claim 15, wherein the cross-support member extends substantially parallel to the axle housing.

18. The axial-based transmission system of claim 15, wherein the first idler wheel is positionable relative to the first drive wheel via a grease cylinder, so as to permit an adjustment of a tightness in the first track.

19. An off-highway vehicle, comprising:

a front chassis portion comprising a front axle assembly, the front axle assembly including a front axle housing and a front axle shaft, the front axle shaft carrying a front wheel hub;

a rear chassis portion comprising a rear axle assembly, the rear axle assembly including a rear axle housing and a rear axle shaft, the rear axle shaft carrying a rear wheel hub;

first and second front ground drive systems, each front ground drive system comprising a front track unit, the front track unit consisting of:

a front drive wheel;

a front idler wheel;

a front track; and a front drive frame member, wherein the front drive wheel is mounted to the front wheel hub, wherein the front idler wheel is mounted to the front axle housing via the front drive frame member and the front idler wheel is located in front of the front drive wheel, and wherein the front track is positioned around the front drive wheel and the front idler wheel; and first and second rear ground drive systems, each ground drive system comprising a rear track unit, the rear track unit consisting of:

a rear drive wheel;

a rear idler wheel;

a rear track; and a rear drive frame member, wherein the rear drive wheel is mounted to the rear wheel hub, wherein the rear idler wheel is mounted to the rear axle housing via the rear drive frame member and the rear idler wheel is located behind the rear drive wheel, and wherein the rear track is positioned around the rear drive wheel and the rear idler wheel;

a cross-support member extending between and interconnecting the front drive frame members of the first and second front ground drive systems forming a rigid connection therebetween; and a cross-support member extending between and interconnecting the rear drive frame members of the first and second rear ground drive systems forming a rigid connection therebetween.

20. The off-highway vehicle of claim 19, wherein:

the front ground drive system comprises first and second front ground drive systems, and the rear ground drive system comprises first and second rear ground drive systems;

each of the front idler wheels has an idler wheel shaft associated therewith, and wherein the respective idler wheel shafts are interconnected by the cross-support member; and the cross-support member is offset from the axis of rotation of the respective drive wheels and idler wheels.

* * * * *